United States Patent
Fukushima et al.

(10) Patent No.: US 7,787,008 B2
(45) Date of Patent: Aug. 31, 2010

(54) THREE-DIMENSIONAL IMAGE DISPLAY DEVICE

(75) Inventors: Rieko Fukushima, Tokyo (JP); Tatsuo Saishu, Tokyo (JP); Kazuki Taira, Tokyo (JP); Yuzo Hirayama, Kanagawa-Ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1579 days.

(21) Appl. No.: 11/053,005

(22) Filed: Feb. 9, 2005

(65) Prior Publication Data

US 2005/0259323 A1  Nov. 24, 2005

(30) Foreign Application Priority Data

Feb. 10, 2004 (JP) ............... 2004-032973
Feb. 4, 2005 (JP) ............... 2005-028905

(51) Int. Cl.
*H04N 13/04* (2006.01)
*G02F 1/1335* (2006.01)

(52) U.S. Cl. .......................................... 348/51; 349/15
(58) Field of Classification Search ............ 348/51, 348/59, 60; 349/15; 353/7
See application file for complete search history.

(56) References Cited

U.S. PATENT DOCUMENTS

| | | | | |
|---|---|---|---|---|
| 3,409,351 | A * | 11/1968 | Winnek | 353/7 |
| 5,546,120 | A * | 8/1996 | Miller et al. | 348/59 |
| 6,064,424 | A * | 5/2000 | van Berkel et al. | 348/51 |
| 6,118,584 | A | 9/2000 | Van Berkel et al. | |
| 6,801,243 | B1 * | 10/2004 | Van Berkel | 348/59 |
| 6,801,263 | B2 * | 10/2004 | Sato et al. | 349/15 |
| 2002/0011969 | A1 | 1/2002 | Lipton et al. | |
| 2003/0067539 | A1 | 4/2003 | Doerfel et al. | |

FOREIGN PATENT DOCUMENTS

EP    0 791 847 A1    8/1997

(Continued)

OTHER PUBLICATIONS

Notification of the First Office Action issued by the Chinese Patent Office on Mar. 28, 2008, for Chinese Patent Application No. 2006101630210, and English-language translation thereof.

(Continued)

*Primary Examiner*—Gims S Philippe
(74) *Attorney, Agent, or Firm*—Finnegan, Henderson, Farabow, Garrett & Dunner, L.L.P.

(57) ABSTRACT

It is possible to provide a three-dimensional image display device which can improved a final resolution balance and can prevent display blocking. A three-dimensional image display device includes: a two-dimensional image display device where pixels constituting a pixel group displaying an elemental image are arranged in a matrix shape; and an optical plate which has exit pupils corresponding to the pixel group and controls light rays from the pixels of the pixel group, wherein the exit pupils in the optical plate are constituted so as to be continued in an approximately vertical direction, and an angle formed between a direction in which the exist pupils are continued and a column direction of a pixel arrangement in the two-dimensional image display device is given by arctan (1/n) when n is a natural number which is different from multiples of 3.

21 Claims, 19 Drawing Sheets

FOREIGN PATENT DOCUMENTS

| | | |
|---|---|---|
| EP | 0 791 847 B1 | 1/2003 |
| JP | 09-236777 | 9/1997 |
| JP | 10-505689 | 6/1998 |
| JP | 10-253926 | 9/1998 |
| JP | 2003-185968 | 7/2003 |
| JP | 2004-212666 | 7/2004 |
| JP | 2007-140553 | 6/2007 |
| JP | 2007-140554 | 6/2007 |
| JP | 2007-188095 | 7/2007 |
| WO | WO 99/05559 | 2/1999 |
| WO | WO 03/007053 A2 | 1/2003 |

OTHER PUBLICATIONS

Notification of the First Office Action issued by the Chinese Patent Office on Oct. 10, 2008, for Chinese Patent Application No. 2006101630193, and English-language translation thereof.

van Berkel, Cees, et al. "Characterisation and Optimisation of 3D-LCD Module Design," Proceedings of SPIE 1997, vol. 3012 (1997), pp. 179-186.

Notification of Reason for Rejection from the Japanese Patent Office, mailed Dec. 5, 2006, in Japanese Patent Application No. 2005-028905 and English translation thereof.

Notification of Reason for Rejection issued by the Korean Patent Office on Oct. 29, 2007 for Korean Patent Application No. 10-2007-0096050, and English-language translation thereof.

R. Fukushima et al., "*Three-Dimensional Image Display Apparatus, Method of Distributing Elemental Images to the Display Apparatus, and Method of Displaying Three-Dimensional Image on the Display Apparatus*", U.S. Appl. No. 10/744,045, filed Dec. 24, 2003.

Y. Hirayama et al., "3D Image Reproduction Apparatus", U.S. Appl. No. 10/614,195, filed Jul. 8, 2003.

K. Taira et al., "*Stereoscopic Image Producing Method and Stereoscopic Image Display Device*", U.S. Appl. No. 10/952,159, filed Sep. 29, 2004.

R. Fukushima et al., "*Three-Dimensional Image Display Device*", U.S. Appl. No. 10/943,198, filed Sep. 17, 2004.

T. Saishu et al., "*Stereoscopic Display Device and Display Method*", U.S. Appl. No. 10/935,626, filed Sep. 8, 2004.

SynthaGram™ Handbook, Feb. 2004 StereoGraphics Corporation, pp. 1-12, (Feb. 2004).

European Search Report issued by the European Patent Office on Dec. 28, 2006, for European Patent Application No. 06 02 4696.

European Search Report issued by the European Patent Office on Jan. 19, 2007, for European Patent Application No. 06024697.2.

Communication issued by the European Patent Office on May 5, 2007, for European Patent Application No. 05 250 759.7.

Van Berkel, "Image Preparation for 3D-LCD," IS&T Conference on Stereoscopic Displays and Applications (Jan. 1999), pp. 84-91.

Van Berkel, et al., "Characterisation and Optimisation of 3D-LCD Module Design", Proceedings of the SPIE, vol. 3012, pp. 179-186, XP009000176, ISSN: 0277-786X, (Feb. 11, 1997).

Notification of Reasons for Rejection issued by the Japanese Patent Office on Apr. 2, 2010, for Japanese Patent Application No. 2007-025794, and English-language translation thereof.

Notification of Reasons for Rejection issued by the Japanese Patent Office on Apr. 2, 2010, for Japanese Patent Application No. 2007-025825, and English-language translation thereof.

Notification of Reasons for Rejection issued by the Japanese Patent Office on Apr. 2, 2010, for Japanese Patent Application No. 2007-025856, and English-language translation thereof.

* cited by examiner

| N (NUMBER OF PARALLAXES) | A (RATIO WHERE VERTICAL RESOLUTION IS DISTRIBUTED TO HORIZONTAL RESOLUTION) | | $\theta$ (INCLINATION OF LENS)[°] | ELEMENTAL IMAGE SIZE (ROW × COLUMN [PIXEL]) |
|---|---|---|---|---|
| $= n^2$ | $= 3/n$ | $1/n$ | $= ARCTAN(1/n)$ | |
| 1 | 3 | 1 | 45.0 | 1 × 1 |
| 4 | 3/2 | 1/2 | 26.6 | 2 × 2 |
| 9 | 1 | 1/3 | 18.4 | 3 × 3 |
| 16 | 3/4 | 1/4 | 14.0 | 4 × 4 |
| 25 | 3/5 | 1/5 | 11.3 | 5 × 5 |
| 36 | 1/2 | 1/6 | 9.5 | 6 × 6 |
| 49 | 3/7 | 1/7 | 8.1 | 7 × 7 |
| 64 | 3/8 | 1/8 | 7.1 | 8 × 8 |
| 81 | 1/3 | 1/9 | | 9 × 9 |
| ... | ... | ... | ... | ... |

FIG. 25

THREE-DIMENSIONAL IMAGE DISPLAY DEVICE

CROSS-REFERENCE TO RELATED APPLICATION

This application is based upon and claims the benefit of priority from prior Japanese Patent Application Nos. 2004-32973, and 2005-28905 filed on Feb. 10, 2004, and Feb. 4, 2005 in Japan, the entire contents of which are incorporated herein by reference.

BACKGROUND OF THE INVENTION

1. Field of the Invention

The present invention relates to a three-dimensional image display device which can display a three-dimensional image.

2. Related Art

Three-dimensional (3-D) image display techniques are classified to various types. When a 3-D image is displayed without using glasses by multiview system, holography, or integral photography system (hereinafter, called "IP system"), for example, the following constitution may be employed. That is, a plurality of pixels for a two-dimensional image display arranged two-dimensionally constitute each of pixels for a 3-D image display, and an optical plate is arranged on a front face of the pixels for a 3-D image display. In the optical plate, an exit pupil designed to be capable of taking only image information or data included in one pixel for a two-dimensional image display from the pixel for a three-dimensional image display is provided for each of pixels for a three-dimensional image display. That is, a viewer can view a three-dimensional image as an autostereoscopic view without using glasses by partially shielding pixels for a three-dimensional image display with the optical plate and making pixels for a two-dimensional image display observed by the viewer through exit pupils different at each viewing position.

In a detailed explanation about the IP system, an image displayed on a pixel for a three-dimensional image display is called "an elemental image". The elemental image corresponds to a pin-hole camera image shot through a pin hole replacing the exit pupil.

Incidentally, an electronic device is lower in resolution than a silver film for a pin hole camera in the existing circumstances, and the term "elemental image" used in this text simply expresses a collection of pixels constituting plural two-dimensional images with different shot angles. That is, of elemental images displayed on individual pixels for a three-dimensional image display with the above constitution, namely, of a collection of constituent pixels for two-dimensional images (parallax images) shot in a plurality of different directions, only image information pieces coincident with an observing direction of a viewer, namely, only image information pieces which should be viewed when a three-dimensional image is actually present are viewed.

A difference between the multiview and the IP system occurs due to a low resolution of an electronic device. Though shooting angles for elemental images should be continuous ideally, they become discrete necessarily due to lack in resolution of an electronic device. In this case, the multiview system is designed such that lines connecting exit pupils and pixels, namely, light rays emitted via exit pupils are converged at a viewing distance, on the other hand, the IP system is not provided with a converging point of light rays.

In a binocular system is a three-dimensional image displaying system which adopts such a design that two-dimensional images acquired at respective shooting positions in a perspective projection manner are converged at a pair of points spaced from each other by an inter-eye distance (about 65 mm). According to this design, a viewer can view individual images (respective two-dimensional images shot at two shooting positions) with his/her right eye and left eye without using glasses at a position where he/she is spaced from a screen by an observation viewing distance L. Further, in a state that at least two pairs of converging points of light rays are arranged in side by side, an image observed with the left eye of a viewer and an image observed with his/her right eye are switched according to movement of a viewing position toward a left and/or a right direction. Accordingly, the viewer can confirm an aspect that a three-dimensional image varies according to movement of the viewing position.

On the other hand, the IP system is a three-dimensional image display system adopting such a design that two-dimensional images shot at respective shooting positions are not converged at one point. For example, such a design is employed that, assuming that a viewing position is spaced from a display plane by infinity, images observed with one eye of the viewer is switched to respective images shot at a plurality of shooting positions according to change in viewing angle. In a representative example, an image for three-dimensional image display can be produced using an image shot according to an parallel projection method by employing such a design that light rays emitted from different exit pupils become parallel.

According to such a design, since observation is not performed physically from a position spaced from a display plane by infinity, a two-dimensional image viewed with a viewer's one eye does not become equal to a two-dimensional image shot at any shooting position. However, a two-dimensional image observed with a viewer's right eye and a two-dimensional image viewed with his/her left eye are each constituted by summing images shot from a plurality of directions by an parallel projection method, so that they averagely become two-dimensional images shot from a viewing position by a perspective projection method. With such a constitution, individual images can be viewed with the right eye and the left eye, and a three-dimensional image which a viewer perceives becomes equivalent to a three-dimensional image recognized when the viewer actually observes a shot object from either direction. That is, the viewing position is not assumed in the IP system.

Regarding the IP system, the multiview system, and further a dense multiview system where converging points are provided at a pitch shorter than an inter-eye distance, differences among them in occurrence of display blocking generated due to a non-display portion in a two-dimensional image display device will be explained.

According to the above-described constitution, in the IP system, a position of a pixel appearing via an exit pupil when observation is performed from one point at a viewing distance is unstable. That is, a position where a pixel is observed varies periodically for each exit pupil. In the IP system, therefore, exit pupils which can view a non-display portion (a boundary between pixels) distribute within a screen periodically and they are viewed as a luminance change within the screen. On the other hand, since the multiview system is designed such that light rays converge at a viewing distance, the same position of a pixel can be viewed from all exit pupils when viewing is performed at one point at the viewing distance. Since the number of pixels converging rays is reduced to 1/n, even when the same position in a pixel is observed from exit pupils of 1/n all exit pupils, even in the dense multiview system where the number of converging points of light rays has been increased to n times thereof. That is, in the IP system, a non-display portion can not be viewed from each exit pupil at all. Alternatively, such a state where only the non-display portion can be viewed from all the exit pupils occurs. In other words, a luminance unevenness or moire occurring due to a non-display portion within a screen in the IP system occurs as luminance distribution unevenness in a space where a viewer is present in the multiview system. In the dense multiview system where a non-display potion can always be viewed at a constant ratio to movement of a viewing position in a horizontal direction by reducing the number of exit pupils which can view a pixel center at a viewing distance to 1/n and increasing the number of the converging points of light rays to n times, luminance change in a space at the viewing distance can be suppressed, but unless an aperture ratio of a two-dimensional image display device or an aperture ratio of an exit pupil (a window portion) in an optical plate is controlled, the luminance change can not be removed completely (for example, refer to U.S. Pat. No. 6,064,424).

In each system of the IP system, the multiview system, and the dense multiview system, since a plurality of pixels for a two-dimensional image display is used to constitute a pixel for a three-dimensional image display, a resolution of a three-dimensional image to be reproduced becomes lower than an original resolution of an electronic device. For purpose of suppressing such a resolution reduction, a method which provides only parallax information or data pieces in a horizontal direction which is effective for acquiring a stereoscopic feeling has been already studied (a one-dimensional IP system and a one-dimensional multiview system). In this case, exit pupils in an optical plate are formed so as to be continuous in a vertical direction, and elemental pixels are developed only in a horizontal direction. That is, the parallax information pieces are not provided in the vertical direction. Regarding the resolution reduction in the horizontal direction, such a method has been studied focusing attention on a pixel arrangement in an electronic device such as an LCD that a resolution in a vertical direction is decreased to 1/3 but a resolution in a horizontal direction is increased to three times by handling a triplet of RGB adjacent to one another vertically as one pixel instead of conventionally handling a triplet of RGB adjacent to one another horizontally as one pixel (for example, refer to JP-A-10-253926).

As described above, in addition to the problem about the resolution lowering, there is the problem about the display blocking due to a non-display portion of a two-dimensional image display device generated by an action between the non-display portion and an optical plate. Regarding this problem, U.S. Pat. No. 6,064,424 has proposed that an optical plate is inclined for solving the display blocking and improving a resolution balance in a three-dimensional image display device of a multiview system. By inclining the optical plate, a region where a non-display portion can be observed at the viewing distance is dispersed spatially, so that a luminance change can be suppressed. However, since the non-display portion in the electronic device is not formed in a vertical stripe shape but in a grating shape, it is necessary to incline a lens and control a numerical aperture of an exit pupil (a window portion) in an optical plate in a two-dimensional image display device strictly in order to suppress the luminance change due to the non-display portion completely. Further, since the vertical resolution can be distributed to the horizontal resolution to a certain extent by inclining the optical plate, a method for improving deterioration in resolution balance by providing parallax information pieces only in the horizontal direction has been described in U.S. Pat. No. 6,064,424.

However, it can not be perceived from the following reason that the resolution balance has been improved sufficiently. When a three-dimensional image is displayed by distributing a plurality of parallax images which are viewable regions in such a system as the IP system or the multiview system, such a problem arises that a resolution in the three-dimensional image display device lowers from an original resolution in an employed two-dimensional image display device due to a constitution of the system and the display blocking occurs due to the non-display portion.

SUMMARY OF THE INVENTION

The present invention has been made in view of these circumstances, and an object thereof is to provide a three-dimensional image display device which can improved a final resolution balance and can prevent display blocking.

A three-dimensional image display device according to a first aspect of the present invention includes: a two-dimensional image display device where pixels constituting a pixel group displaying an elemental image are arranged in a matrix shape; and an optical plate which has exit pupils corresponding to the pixel group and controls light rays from the pixels of the pixel group, wherein the exit pupils in the optical plate are constituted so as to be continued in an approximately vertical direction, and an angle formed between a direction in which the exist pupils are continued and a column direction of a pixel arrangement in the two-dimensional image display device is given by arc tan (1/n) when n is a natural number which is different from multiples of 3.

The standard number of parallaxes N can be given by square $n^2$ of the natural number n.

It is preferable that n is a natural number of 4 or more.

It is preferable that n is 4 or 5.

A ratio of a horizontal resolution to a vertical resolution in a three-dimensional image can be coincident with a ratio of a horizontal resolution to a vertical resolution in the two-dimensional image display device.

A pixel region constituting the elemental image can be formed in an approximately square shape.

A formation region of the elemental image can be an approximately square region of n rows×n columns, and RGB sub-pixels having the same parallax number can be positioned over three rows of the n rows forming the elemental image, which are different from one another.

A formation region of the elemental image can be an approximately square region of n rows×n columns, and RGB sub-pixels having the same parallax number can be positioned over three columns of the n columns forming the elemental image, which are different from one another.

Three sub-pixels of R, G, and B whose positions viewed through the exit pupils are close to one another of a plurality of sub-pixels forming a pixel region displaying the elemental image can be grouped and attached with the same parallax number.

When arrangements of RGB sub-pixels having the same parallax number belong to different elemental image, the arrangements can be the same.

When m and l are positive integers, arrangement of RGB sub-pixels having parallax number m and arrangement of RGB sub-pixels having parallax number (m+n×l) can be the same.

When a plurality of elemental images are viewed through a single column extending over the plurality of elemental images, the parallax number continuously can increase upwardly from 1 to N and the increase can be repeated.

A three-dimensional image display device according to a second aspect of the present invention includes: a two-dimensional image display device where pixels constituting a pixel group displaying an elemental image are arranged in a matrix shape; and an optical plate which has exit pupils corresponding to the pixel group and controls light rays from the pixels of the pixel group, wherein the exit pupils in the optical plate are constituted so as to be continued in an approximately vertical direction, and an angle formed between a direction in which the exist pupils are continued and a column direction of a pixel arrangement in the two-dimensional image display device is given by arc tan (1/n) when n is a natural number which is different from 3, and the standard number N of parallaxes is given by square $n^2$ of the natural number n It is preferable that n is a natural number of 4 or more.

The standard number N of parallaxes can be 16 or 25.

A three-dimensional image display device according to a third aspect of the present invention includes: a two-dimensional image display device where pixels constituting a pixel group displaying an elemental image are arranged in a matrix shape; and an optical plate which has exit pupils corresponding to the pixel group and controls light rays from the pixels of the pixel group, wherein the exit pupils in the optical plate are constituted so as to be continued in an approximately vertical direction, and an angle formed between a direction in which the exist pupils are continued and a column direction of a pixel arrangement in the two-dimensional image display device is given by arc tan (1/n) when n is a natural number of 4 or more.

BRIEF DESCRIPTION OF THE DRAWINGS

FIG. 25 is a table showing a relationship among the number of parallaxes N, a ratio "a" where a vertical resolution is distributed to a horizontal resolution, and a size of an elemental image when a ratio of lowering in resolution in a horizontal direction is caused to coincide with that in a vertical direction.

DESCRIPTION OF THE EMBODIMENTS

Figure 2:
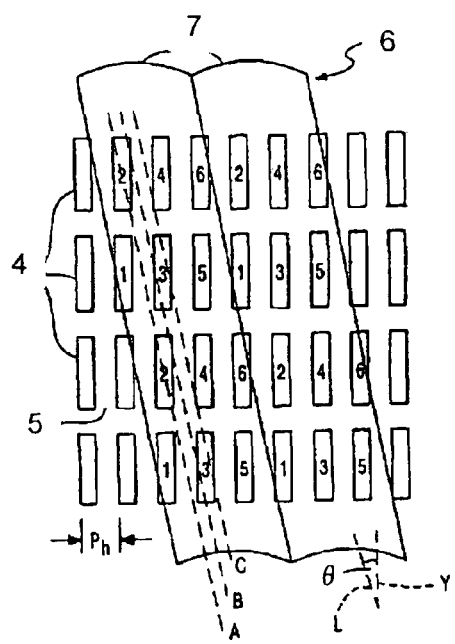
FIG. 2 is a diagram for explaining an outline of the three-dimensional image display device according to the embodiment of the invention.

Embodiment of the present invention will be explained below with reference to the drawings. In respective figures, constituent elements having similar or identical functions are denoted with same reference numerals and further explanation thereof will be omitted.

Figure 24:
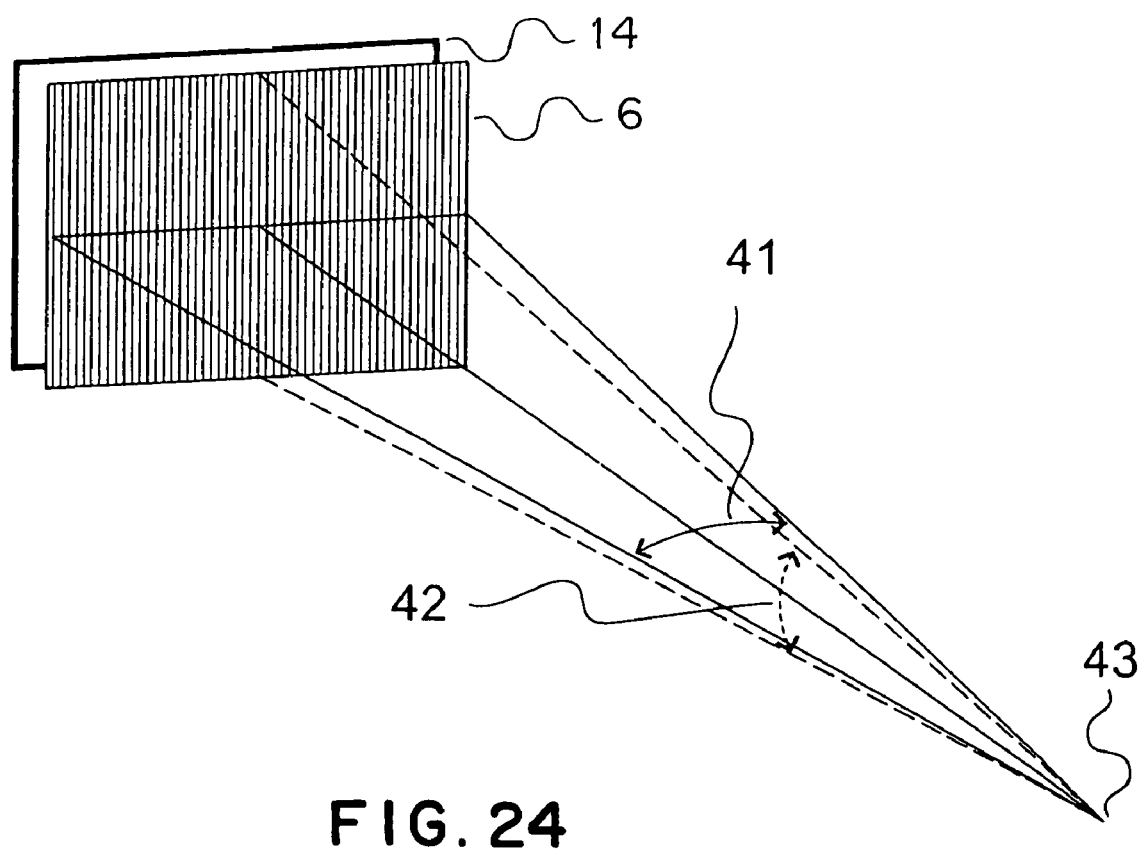
FIG. 24 is a diagram showing an ordinary constitution of a three-dimensional image display device.

A three-dimensional image display device according to one embodiment of the present invention will be explained with reference to the drawings. First of all, an ordinary constitution of a three-dimensional image display device is shown in FIG. 24. The three-dimensional image display device shown in FIG. 24 is provided with a two-dimensional image display device 14 constituted of, for example, a liquid crystal panel, and an optical plate 6.

The two-dimensional image display device 14 must have a constitution that pixels positioned within a display plane are flatly arranged in a matrix manner, but it may be a liquid crystal display device of a direct viewing type or a projection type, a plasma display device, a display device of electric field emission type, an organic EL display device, or the like. As the optical plate 6, a plate with slits or lenticular lenses extending in a generally vertical direction and arranged in a cyclic manner in a generally horizontal direction is used. In this case, there are parallaxes only in a horizontal direction 41 and an image varies according to a viewing distance, but since there is not an parallax in a vertical direction 42, a fixed image can be viewed irrespective of a viewing position. In FIG. 24, reference numeral 43 denotes a position of a single eye of a viewer.

In the three-dimensional image display device according to the embodiment, a display plane on the two-dimensional image display device includes sub-pixels of R (red), G (green), and B (blue) arranged in an array manner. The sub-pixels of R (red), G (green), and B (blue) can be realized by arranging a color filter on the display plane properly. In the embodiment, as shown in FIG. 2, the optical plate 6 is constituted of, for example, lenticular lenses 7. A longitudinal axis of each lenticular lens 7 is inclined to a sub-pixel column by a predetermined angle θ (≠0). In FIG. 2, reference numeral 4 denotes an opening portion of a sub-pixel and reference numeral 5 denotes a black matrix. In this embodiment, the sub-pixel includes the opening 4 and the black matrix 5. Accordingly, the sub-pixels are arranged so as to be adjacent to one another vertically and horizontally. Each sub-pixel has an aspect ratio (a ratio of a vertical size to a horizontal size) of 3:1.

In the embodiment, the reason why the longitudinal axis of the lenticular lens 7 is inclined to the sub-pixel column by the predetermined angle θ (≠0) will be explained below.

Three sub-pixels of R, G, and B arranged vertically are handled as one pixel in order to increase a horizontal resolution, and when the optical plate 6 is inclined, a horizontal resolution H and a vertical resolution V in a three-dimensional image to be displayed are expressed by the following equations (1).

$$H = Horiginal \times 3 \div N \div a$$

$$V = Voriginal \div 3 \times a \quad (1)$$

Here, Horiginal represents a horizontal resolution of a two-dimensional image display device, Voriginal represents a vertical resolution of the two-dimensional image display device, N represents the number of parallaxes, and "a" represents a ratio of the vertical resolution which is distributed to the horizontal resolution by inclining the optical plate.

Therefore, when the ratio of the vertical resolution Voriginal to the horizontal resolution Horiginal in the two-dimensional image display device is maintained even in the three-dimensional image display device, a relationship of the following equation (2) must be satisfied.

$$Horignal : Voriginal = (Horiginal \times 3 \div N \div a) : (Voriginal \div 3 \times a)$$

That is, $3/(N \cdot a) = a/3$

Therefore, $N = (3/a)2$ \quad (2)

Figure 1:
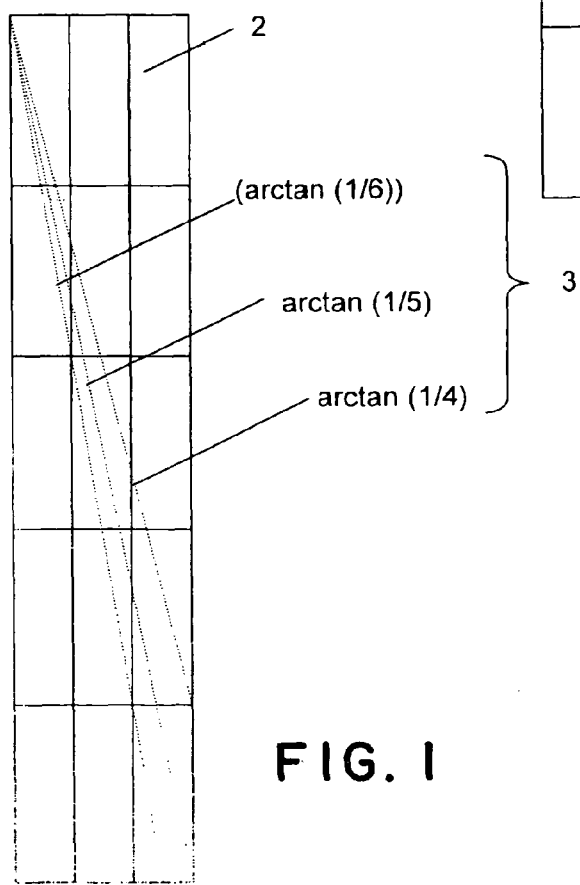
FIG. 1 is a diagram showing pixel columns and inclination angles of a region observed by a single eye via a single exit pupil in an optical plate in a two-dimensional image display device in a three-dimensional image display device according to one embodiment of the present invention.

Next, a phenomenon where the vertical resolution is distributed to the horizontal resolution by inclining the optical plate will be explained. FIG. 1 is a diagram showing various inclinations of an optical plate to pixels in a two-dimensional image display device. In FIG. 1, reference numeral 3 denotes a region which is observed with a single eye via one of exit pupils continuous in a generally vertical direction of the optical plate 7 whose focus point is caused to coincide on the two-dimensional image display device. The region indicated by the reference numeral 3 shifts in a horizontal direction according to movement of the viewing position. When the exit pupils in the optical plate 7 are formed so as to be continuous vertically in the same manner as the above pixels like the conventional art, pixels (whose centers are coincident with the regions indicated by reference numeral 3) whose centers are viewed via one of the exit pupils in the optical plate 7 are all pixels included in one column or zero, and a cycle where two states are switched from one to the other by movement of the regions indicated by the reference numeral 3 according to movement of a viewer coincides with a horizontal width of a sub-pixel. On the other hand, by inclining the optical plate 7, he number of pixels whose centers can coincide with the regions indicated by the reference numeral 3 is decreased and a cycle where pixels whose centers coincident with the regions appear when the regions indicated by the reference numeral 3 moves according to movement of a viewer becomes shorter than the width of the sub-pixel. Further, the centers of pixels are selected and simultaneously a non-display portion between sub-pixels adjacent to each other in a horizontal direction is present necessarily in the regions indicated by reference numeral 3. In FIG. 1, an example where vertical four rows, vertical five rows, and vertical six rows are respectively inclined to horizontal three columns is shown. The positional relationship between the regions indicated by the reference numeral 3 and the pixels is repeated for every three columns for the vertical four rows, for every four rows for the vertical five rows, and for every one for the vertical six rows. That is, the number of pixels (having the same portion observed via one of exit pupils continuous in a generally vertical direction) having the same relative position to the regions indicated by reference numeral 3 is reduced to ¼, ⅕, and ½. On the other hand, regarding the horizontal direction, pixels whose centers coincide with the regions indicated by the reference numeral 3 appear at a cycle of a ¼ sub-pixel width, a ⅕ sub-pixel width, and a ½ sub-pixel width, as compared with the case that the optical plate is arranged vertically to the pixels. That is, the horizontal resolution is increased to four times, five times, and two times. An advantage obtained by distributing such a resolution to the horizontal resolution and means for preventing the display blocking caused due to the non-display portion have been described in detail in U.S. Pat. No. 6,064,424.

As described above, though the vertical resolution can be distributed to the horizontal resolution by inclining the optical plate, when parallax images are distributed at a sub-pixel pitch, the degree of the distribution is affected by a shape of the sub-pixel 2. For example, when a liquid crystal display device used as a two-dimensional image display device employs such a design that a square pixel is constituted of three sub-pixels of RGB and such a design that many vertical straight lines such as characters are displayed, since a color filter with a vertical stripe arrangement is often used, the shape of the sub-pixel has a ratio of vertical:horizontal=3:1, such as shown in FIG. 1. Consideration is made about a case that one pixel is handled with three sub-pixels 2 dispersed in different three columns, instead of three sub-pixels adjacent to one another in a horizontal direction, in order to increase the horizontal resolution in the three-dimensional image display device. When the inclination θ of a ridge line of an optical plate is expressed as the following equation 3, a cycle where pixels whose centers coincide with the regions indicated by the reference numeral 3 appear becomes 1/n of the sub-pixel width so that the horizontal resolution per sub-pixel unit becomes n times.

$$\theta = \arctan(1/n) \quad (3)$$

Simultaneously, since one pixel (a triplet) is constituted of three sub-pixels (which do not coincide with one another in the vertical direction) of RGB whose centers are coincident with regions indicated by reference numeral 3 at the 1/n cycle and which are adjacent to one another in the horizontal direction, the ratio "a" where the vertical resolution is distributed to the horizontal resolution is represented as the following equation 4.

$$a = 3/n \quad (4).$$

That is, in the triplet at a time of three-dimensional image display in the present invention, observation allowable positions for three sub-pixels of RGB slightly deviate from one another (the regions indicated by the reference numeral 3 and the centers of three sub-pixels of RGB do not coincide with each other simultaneously). Therefore, such a coincidence is expressed below as "substantial coincidence" in this text. Since a portions of pixels can be actually viewed via exit pupils in a state where the regions indicated by the reference numeral 3 do not coincide with the centers of pixels, a region where sub-pixels of RGB with the substantial coincidence can be viewed simultaneously is present. In the case shown in FIG. 1, therefore, θ=arc tan (¼), arc tan (⅕), and arc tan (⅙) are obtained, the ratio "a" where the vertical resolution is distributed to the horizontal resolution becomes ¾, ⅗, and ½.

Accordingly, the lowering percentages of the resolutions of the horizontal direction and the vertical direction are caused to coincide with each other by inclining the optical plate according to the equation (3) and simultaneously setting the relationship between n and N so as to meet the above-described equation (2). That is, design may be made so as to meet the following relationship between n and N.

$$N = n^2 \quad (5)$$

The number of parallaxes N, a ratio "a" where the vertical resolution is distributed to the horizontal resolution, the inclination angle θ of the lens, and the elemental image size to respective natural numbers n are shown in FIG. 25. As understood from FIG. 25, in case of N=9 (n=3), an advantage obtained by distributing the vertical resolution to the horizontal resolution and an advantage of preventing display blocking due to a non-display portion can not be obtained due to the shape of the sub-pixel 2.

An example where the number N of parallaxes is set so as to meet the relationship of the equation (5) will be explained with a QUXGA panel (a panel having a horizontal resolution H of 3200 and a vertical resolution V of 2400).

$$(3200 \times 3 \div 16 \div a):(2400 \div 3 \times a) = 800:600$$

That is, a=¾→SVGA $$(3200 \times 3 \div 25 \div a):(2400 \div 3 \times a) = 640:480$$

That is, a=⅗→VGA

That is, by controlling the number of parallaxes and the inclination according to the equations (2) to (4), the resolution of a three-dimensional image to be displayed could be caused to coincide with an ordinary resolution in the conventional two-dimensional image display.

Differences between the embodiment and the art disclosed in U.S. Pat. No. 6,064,424 will be explained below in detail.

Figure 3:
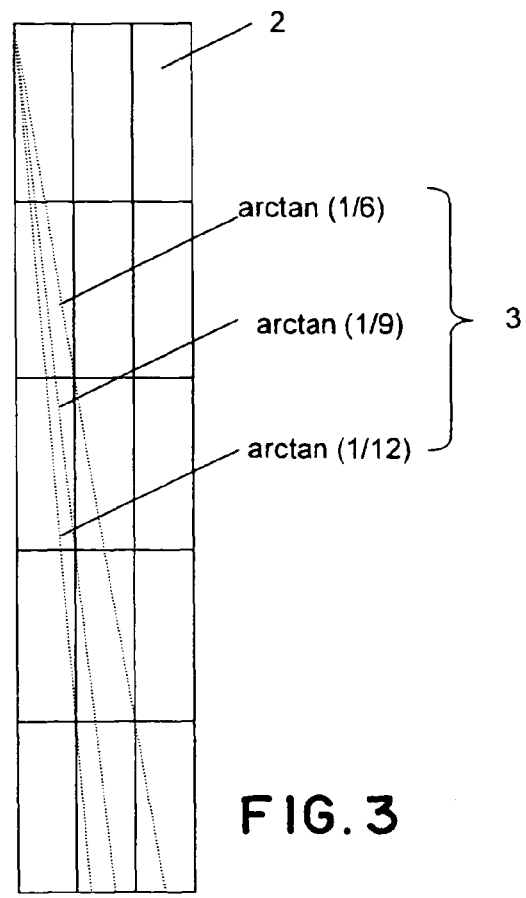
FIG. 3 is a diagram showing pixel columns and inclination angles of a region observed by a single eye via a single exit pupil in an optical plate for a two-dimensional image display device in a conventional three-dimensional image display device.

First of all, in the art disclosed in U.S. Pat. No. 6,064,424, distribution of such a small number of parallaxes as 3, 5, 6, or 7 is made according to such an inclination as θ=arc tan (1/n), (n=6, 9, 12) in a SVGA panel (resolution: 800 (H)×600 (V)) (refer to FIG. 3). Therefore, when calculation is made using the calculation method (the equations (1) to (4) of the embodiment, the horizontal resolution becomes very high. For example, in an example where 6 parallaxes are distributed according to θ arc tan (⅙) (refer to FIG. 2), n=6 is obtained according to the equation (4) and a=½ is obtained according to the equation (3). That is, since the ratio "a" where the vertical resolution is distributed to the horizontal resolution by the inclination is ½, a=½ is obtained.

That is, (800×3÷6÷a):(600÷3×a)=800:100 is obtained, which results in very high horizontal resolution. Similarly, when 5 parallaxes are distributed according to θ=arc tan (⅙) and 7 parallaxes are distributed to θ=arc tan (⅙), the followings are obtained.

$$a = \frac{1}{2}$$

That is, (800×3÷5÷a):(600÷3×a)=960:100

$$a = \frac{1}{2}$$

That is, (800×3÷7÷a):(600÷3×a)=685:100

Figure 5:
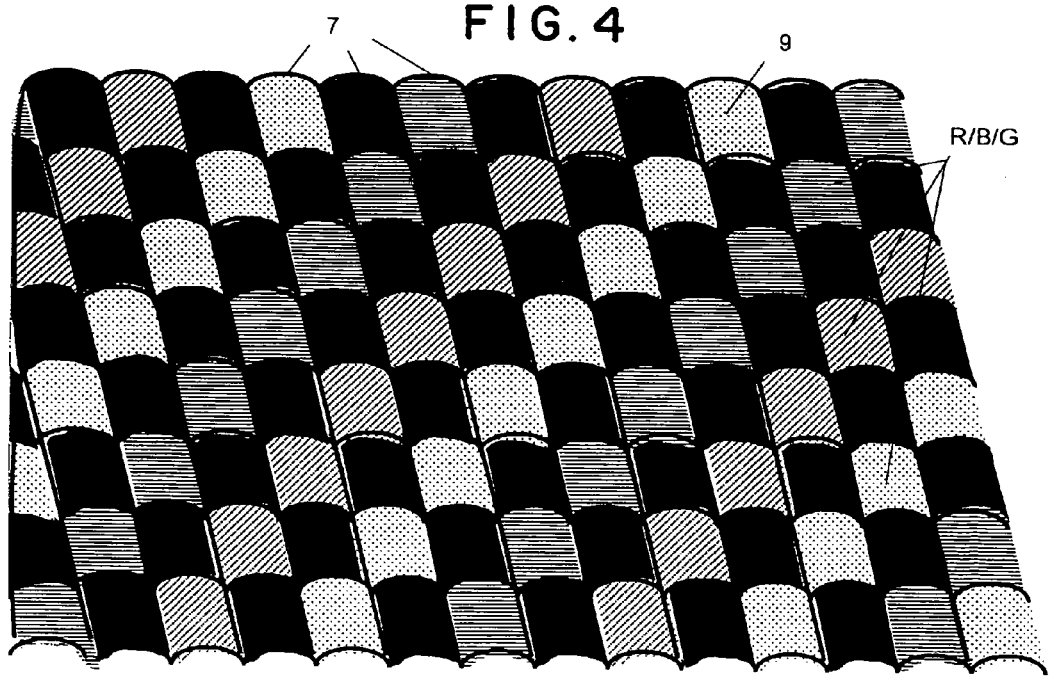
FIG. 5 is a view showing arrangement of RGB sub-pixels when the conventional three-dimensional image display device is observed with a single eye.

Incidentally, the resolutions in the art described in U.S. Pat. No. 6,064,424 are 480×200 and 342×200, or the ratios of the horizontal resolution to the vertical resolution are 480:200 and 342:200, which are different in value from the above calculations. As the reason, U.S. Pat. No. 6,064,424 describes the fact that such a design that each sub-pixel of RGB constitutes an almost square image in a state that they are viewed via the optical plate is adopted (refer to FIG. 5). In FIG. 5, reference numeral 9 denotes a sub-pixel for a three-dimensional image display. In the art described in U.S. Pat. No. 6,064,424, there is a proposal that three sub-pixels of RGB of RGB sub-pixels constituting almost square pixels in a state the they are viewed via the optical plate which are positioned relatively near to one another are grouped to be handled as one pixel. Even if such handling is employed, the ratio of the horizontal resolution to the vertical resolution such as 480:200 or 342:200 is a resolution balance unique in the art disclosed in U.S. Pat. No. 6,064,424, where a three-dimensional image is not constituted of square pixels of a RGB triplet which has an ordinary pixel shape.

Figure 4:
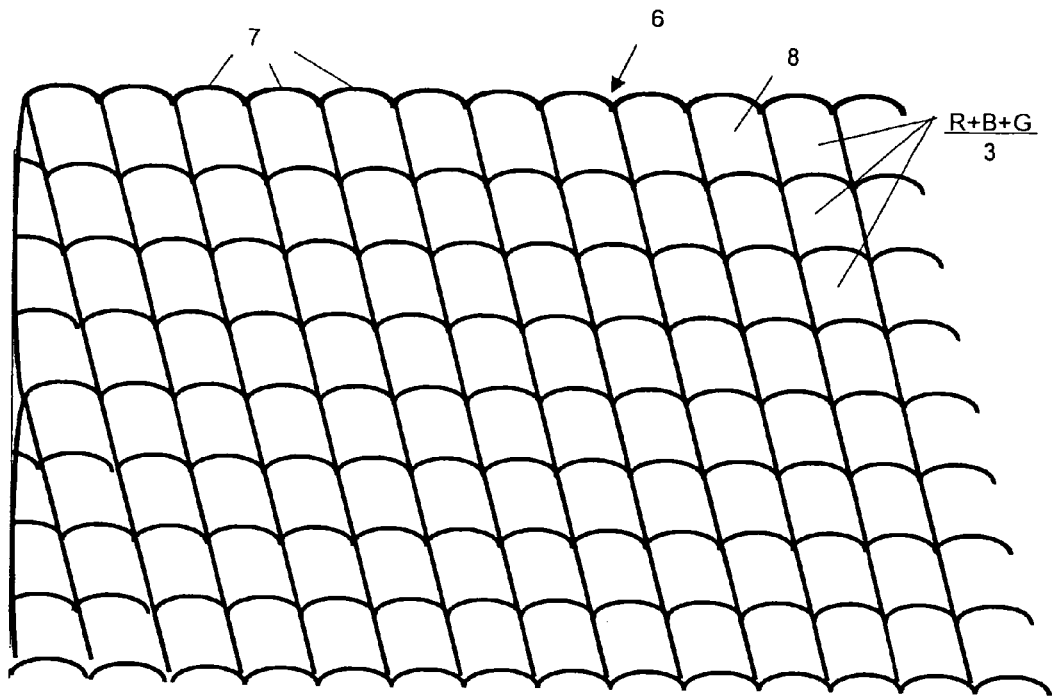
FIG. 4 is a view showing arrangement of RGB sub-pixels when the three-dimensional image display device according to the embodiment is observed with a single eye.

The three-dimensional image display device according to the embodiment is quite different in the above point from the art disclosed in U.S. Pat. No. 6,064,424. This embodiment is constituted such that a triplet of RGB is viewed as a square pixel. That is, a design is employed that the relationship between the inclination and the number of parallaxes is defined according to the equations (2) to (4) and RGB triplets of constituent pixels constituting an image viewed via the optical plate become an almost square (refer to FIG. 4). In FIG. 4, reference numeral 8 denotes a pixel in the three-dimensional image display.

Figure 6A:
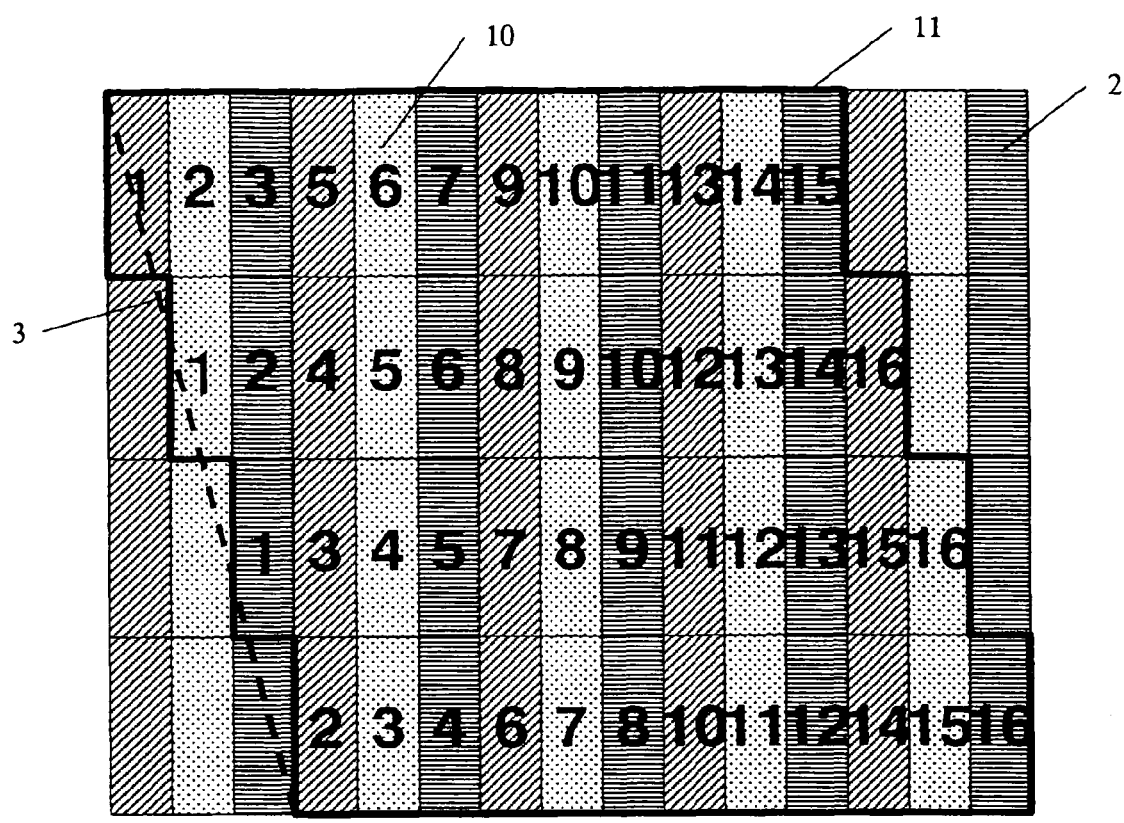
FIGS. 6A and 6B are diagrams showing characteristics according to one embodiment of the invention, FIG. 6A being a diagram showing arrangement of parallax images on a display element using a color filter with a stripe arrangement when an inclination of a single exit pupil in an optical plate is set to arc tan (¼) and FIG. 6B being a diagram showing relative positions among a plurality of elemental images.
Figure 6B:
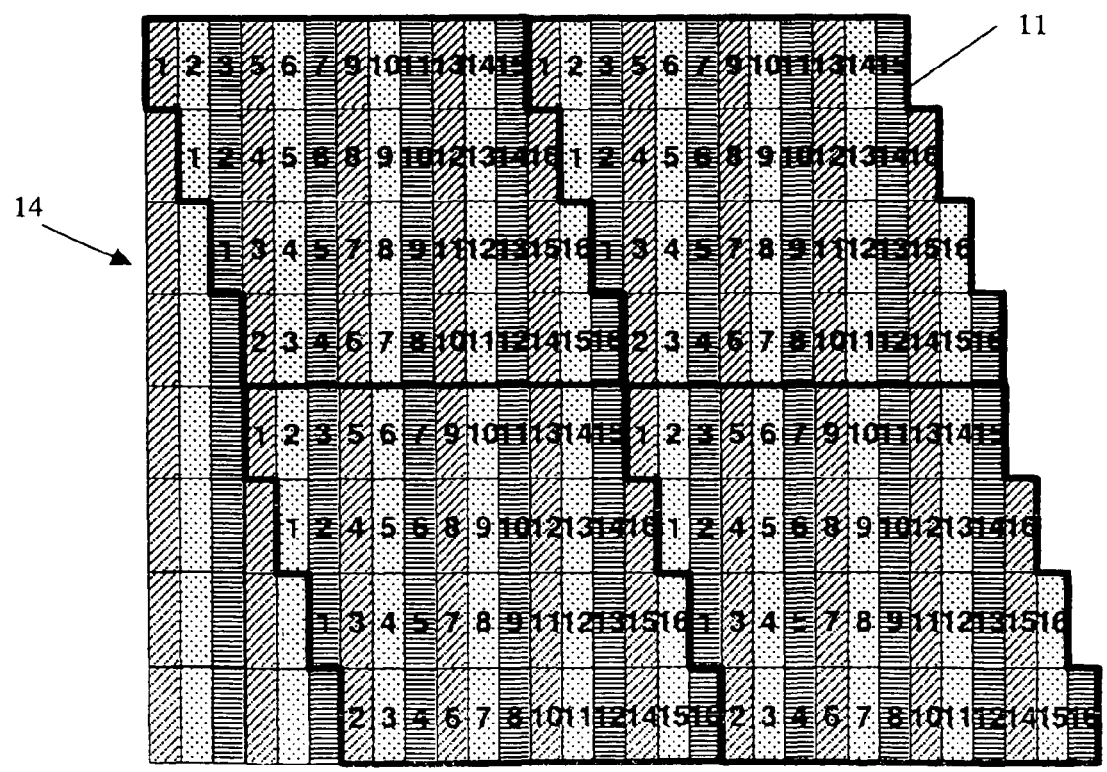

Regarding a pixel mapping for realizing the above design, a case of N=16 in the above-described QUXGA panel will be explained with reference to FIGS. 6A and 6B. FIG. 6A is a diagram showing arrangement of parallax images to a two-dimensional image display device with color filters arranged in a stripe manner when an inclination of a lenticular sheet 7 is set to arc tan (¼), and FIG. 6B is a diagram showing relative positions of a plurality of elemental images. In FIGS. 6A and 6B, reference numeral 10 denotes a parallax number, and reference numeral 11 denotes a diagram showing a range where an exit pupil corresponding to a single pixel which is a constituent unit for a three-dimensional image and an elemental image corresponding thereto are displayed. The number of parallaxes (N=16) and the inclination angle (θ=arc tan (¼)) of an optical plate are determined according to the equations (2) to (4). As a result, the pixel for a three-dimensional image display is defined as a parallelogram (an almost square) constituted of 4 rows×4 pixel (triplet) columns (=a 12 sub-pixel row). RGB sub-pixels are mapped over different rows so as to meet an adoption ratio of ¾ (=a) in the parallelogram. That is, a pixel for a three-dimensional image display constituted of 3 rows (=RGB)×(5+⅓) pixel (triplet) columns (=16 sub-pixel row)=48 sub-pixels when the optical plate was not inclined could be formed in an almost square while maintaining the summed number of sub-pixels.

Next, an advantage obtained by making the pixel for a three-dimensional image display almost square will be explained. When an advantage obtained by inclining the optical plate is not utilized, the horizontal resolution/vertical resolution is designed as follows:

Since an outer shape of a QUXGA panel of H (3200×3.16)×V (2400÷3)=H (600)×V (800) has horizontal:vertical=4:3, when the horizontal resolution/the vertical resolution (the number of pixels) meets 4:3, sampling intervals in a horizontal direction and in a vertical direction are the same, so that a pixel shape at a display time of a three-dimensional image becomes square. Here, specifically, the pixel for a three-dimensional image display indicates a region on which an elemental image which is a collection of parallax images constituted of parallax images acquired (shot/prepared) from a plurality of directions. In the number of pixels for a three-dimensional image such as the conventional H (600)×V (800), since sampling intervals in the horizontal direction and in the vertical direction are different from each other (a pixel shape at a display time of a three-dimensional image is not square), the elemental image is composed by preparing parallax images with a resolution of, for example, H (3200×3)×V (2400) and removing unnecessary pixel information elements from these parallax images to change these parallax images to parallax images with a low resolution of H (600)×V (800).

In the embodiment, such a constitution is employed focusing attention on the above waste that parallax images can be acquired with a resolution for a pixel for a three-dimensional image display by reflecting a ratio of a horizontal number of pixels to a vertical number of pixels in screen size and make sampling intervals in the horizontal direction and in the vertical direction equal to each other to make a pixel shape at a display time of a three-dimensional image almost square. That is, in a three-dimensional image display device using the QUXGA panel, parallax images for SVGA panel are acquired in case of 16 parallaxes or parallax images for VGA panel are acquire in case of 25 parallaxes, and an elemental image can be prepared by mapping the parallax images. In this case, parallax image information elements do not include pixel information which is not used (or removed). By forming a pixel for a three-dimensional image display in a square, speed-up in 3D—CG (three-dimensional image computer graphic) contents production can be achieved and lowering in resolution required for actual shooting can be made possible.

Further, a secondary advantage obtained by causing the resolution of the three-dimensional image display to the conventional one to coincide with each other includes such a fact that handling when two-dimensional image contents is displayed in the three-dimensional image display device is made easy. It is assumed easily that two-dimensional image contents are displayed even in the three-dimensional image display device. Display of the two-dimensional image contents in the three-dimensional image display can be achieved simply by setting equal parallax information pieces within the elemental image (the same image can be always viewed regardless of a viewing position). That is, in the three-dimensional image display device using the QUXGA panel, when 2D (two-dimensional image) contents for SVGA to 16 parallaxes or for VGA to 25 parallaxes are inputted, a two-dimensional image can be displayed as it is by simply increasing the two-dimensional image information pieces by 16 times or 25 times to develop them within the pixel for a three-dimensional image display.

In addition, even when two-dimensional image contents with a resolution other than the above resolution are inputted, since a general technique for performing conversion between resolutions for a two-dimensional image itself has been already generalized, if the three-dimensional image display device itself has been set to an existing resolution, the two-dimensional image contents may be developed after the resolution thereof is corrected to the existing resolution. Even if such a design is employed that the resolution of the three-dimensional image is not an existing resolution but it is x times thereof or 1/y times thereof (x and y: integers), since such a design can be accommodated by simply developing data pieces for a conventional or existing resolution to x times, or simply compressing or thinning them to 1/y times. Therefore, designing the resolution for the three-dimensional image display to a resolution of an integral multiple of the conventional or existing resolution or a resolution of 1/integer thereof is effective for reducing load for image processing.

Assuming that three-dimensional image display devices of various types are present, there is a high possibility that the resolution of the conventional or existing two-dimensional image is utilized as a format. Considering such a future development, designing a display resolution in the three-dimensional image display device to the resolution in the exiting two-dimensional image display, or the resolution of the integral multiple of the resolution in the existing two-dimensional image display or the resolution of 1/integer thereof has important significance.

Figure 7A:
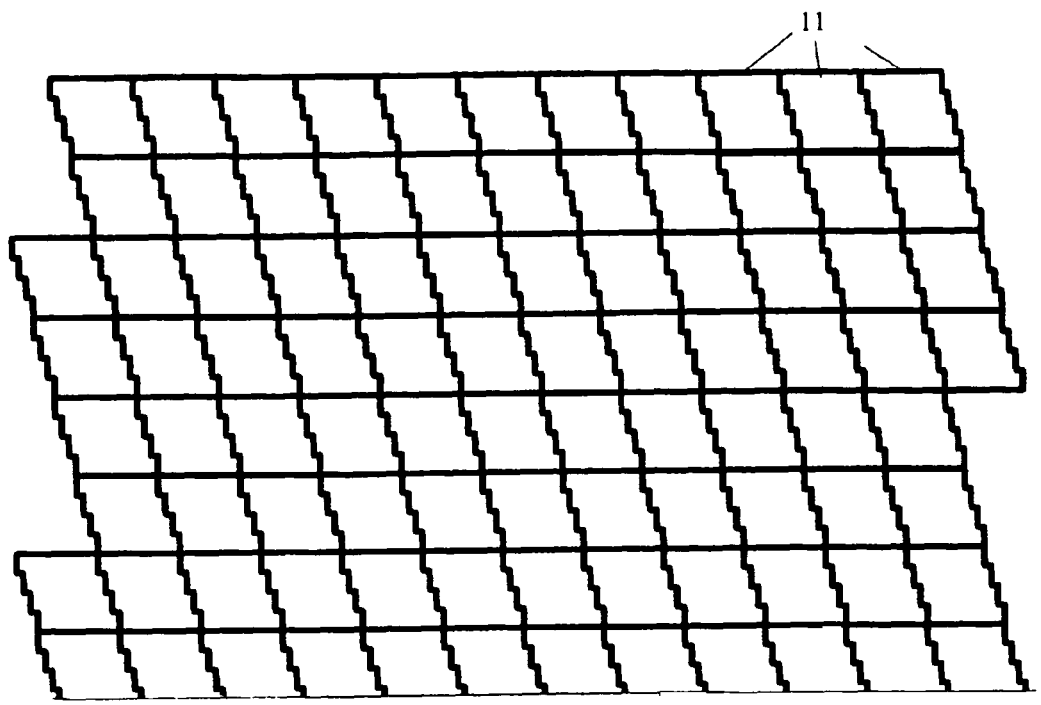
FIGS. 7A and 7B are diagrams showing characteristics according to one embodiment of the invention, FIG. 7A being a diagram showing arrangement of elemental images on a display element using a color filter with a stripe arrangement when an inclination of a single exit pupil in an optical plate is set to arc tan (¼) and FIG. 7B being a diagram showing an appearance of an optical plate combined with the elemental images shown in FIG. 7A.
Figure 7B:
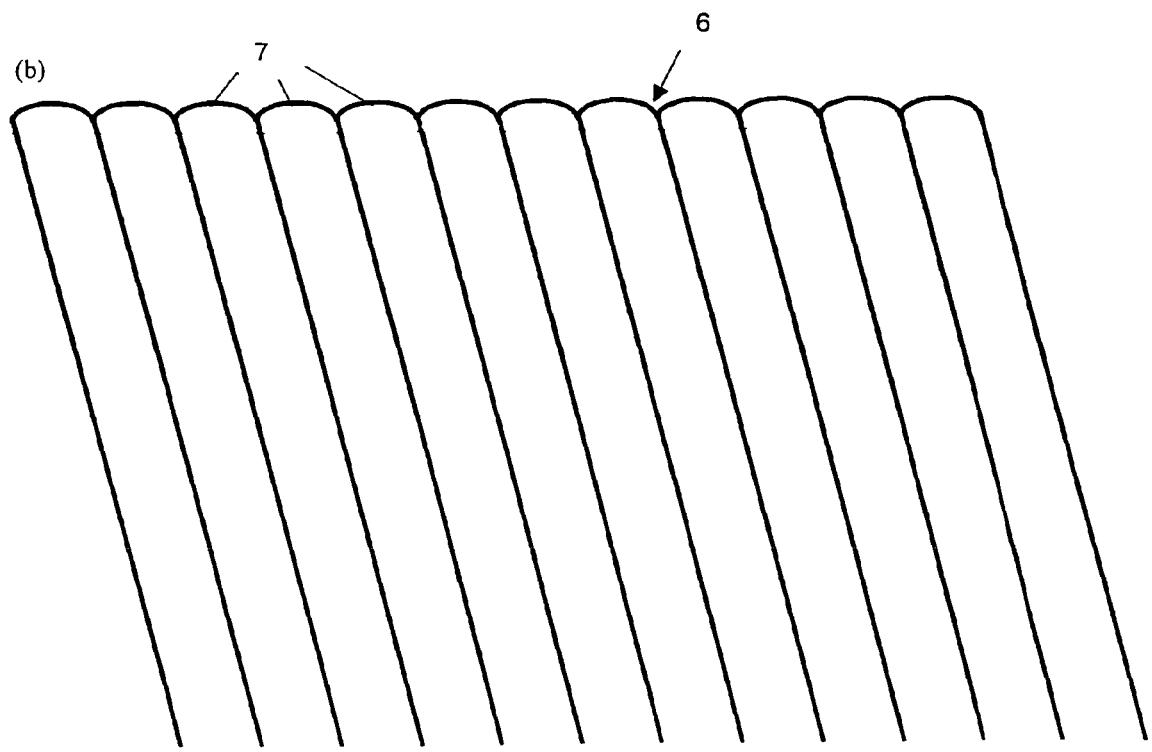

FIGS. 7A and 7B are image views of screens viewed by making a pixel for a three-dimensional image display square. FIG. 7A is a view showing a portion of arrangement of elemental images on a two-dimensional image display device with a color filter arranged in a stripe manner when the inclination of the lenticular sheet 7 is set to arc tan (¼), and FIG. 7B is a view showing an appearance of a portion of a lenticular sheet 7 combined with the elemental images. The elemental image 11 is formed in an almost square shape and it is combined with the lenticular sheet 7 so that one pixel for a three-dimensional image display is constituted. Information about 16 parallaxes is included in one pixel for a three-dimensional image display by the picture-mapping in FIGS. 6A and 6B, and the parallax image number viewed through the lenticular sheet is changed from one to another according to movement of a viewing position so that a stereoscopic view is realized.

Figure 8:
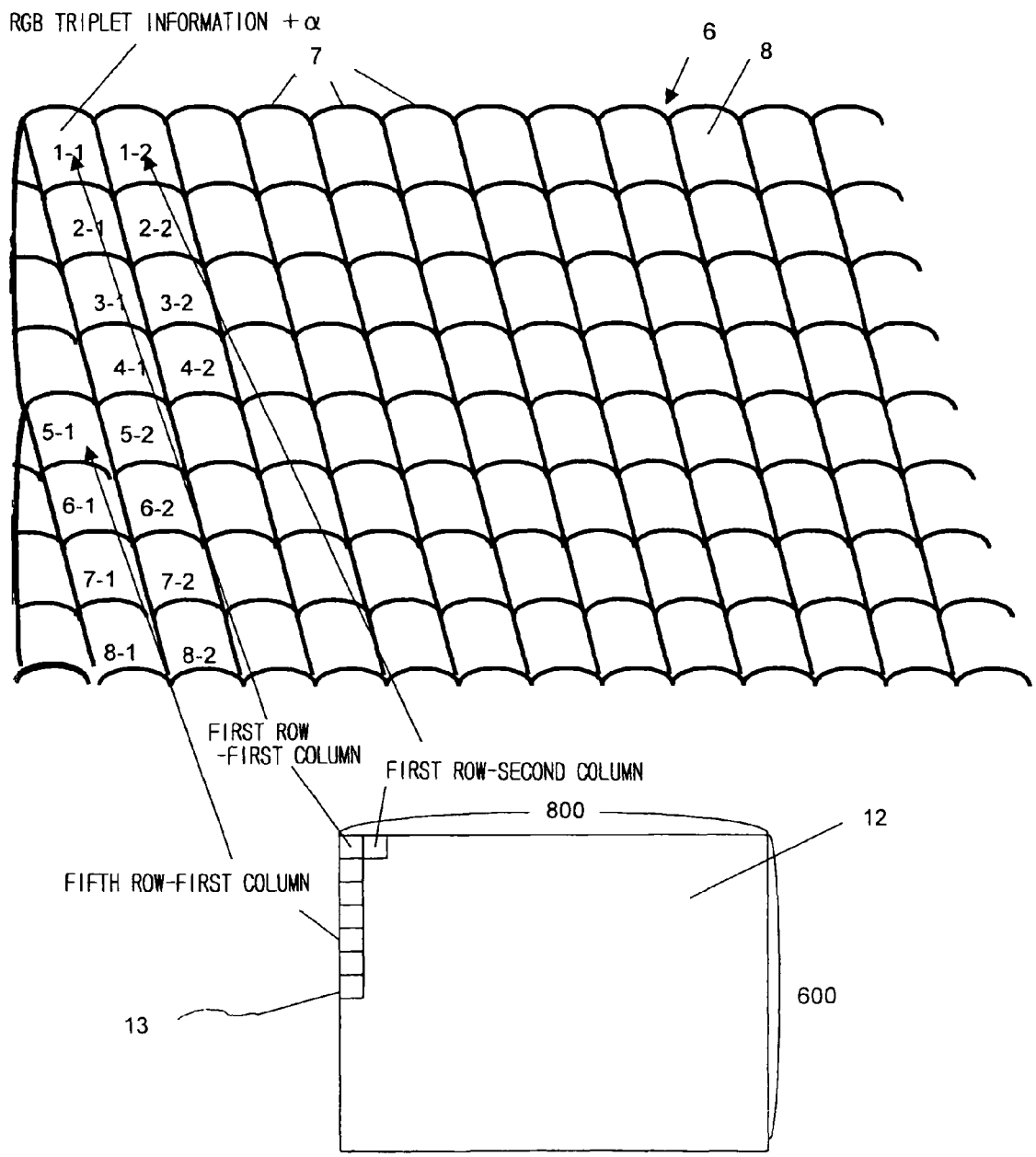
FIG. 8 is a diagram showing how to distribute, to a three-dimensional image display device, pixel information pieces constituting a parallax image acquired from a plurality of different directions at a low resolution by an parallel projection when an inclination of a single exit pupil in an optical plate is set to arc tan (¼) in a three-dimensional image display device according to one embodiment of the invention.

Next, a method for arranging parallax images acquired from a plurality of directions will be explained with reference to FIG. 8. FIG. 8 is a diagram showing distribution, to respective pixels on a three-dimensional image display device, of image information pieces constituting parallax images acquired from a plurality of directions with a low resolution by parallel projection corresponding to a horizontal direction and by perspective projection corresponding to a vertical direction in a state that an inclination of the optical plate 6 is set to arc tan (¼). In FIG. 8, reference numeral 8 denotes a pixel for a three-dimensional image display observed through a lenticular sheet, reference numeral 12 denotes a parallax image acquired with a resolution of 800 (H)×600 (V) from a certain direction, and reference numeral 13 denotes a pixel (triplet) constituted of three sub-pixels of RGB constituting a two-dimensional image which is a parallax image. The RGB triplet 13 constituting the parallax images 12 acquired from a plurality of directions is mapped as one parallax image for an elemental image constituting each pixel 8 for a three-dimensional image display shown in FIG. 8. A correspondence relationship between the RGB triplets 13 and the pixels 8 for a three-dimensional image display is shown with arrows in FIG. 8. Since one pixel in the three-dimensional image display forms a parallelogram, correspondence to parallax image information can be obtained by shifting a pixel for a three-dimensional image display to the left by one pixel for every four columns of the pixel 8 for a three-dimensional image display. The shift corresponds to one pixel shifting in a three-dimensional image display resolution of 800×400. Therefore, when the three-dimensional image display becomes sufficiently high, the shift can be suppressed to such an extent that a viewer is not nervous about the shift.

The information about a single parallax image has been explained here, but an elemental image corresponding to all pixels for a three-dimensional image display can be prepared by distributing parallax images with a resolution of 800 (H)× 600 (V) acquired from a plurality of directions (here, 16 directions) according to FIG. 8→FIGS. 6A and 6B.

Figure 9:
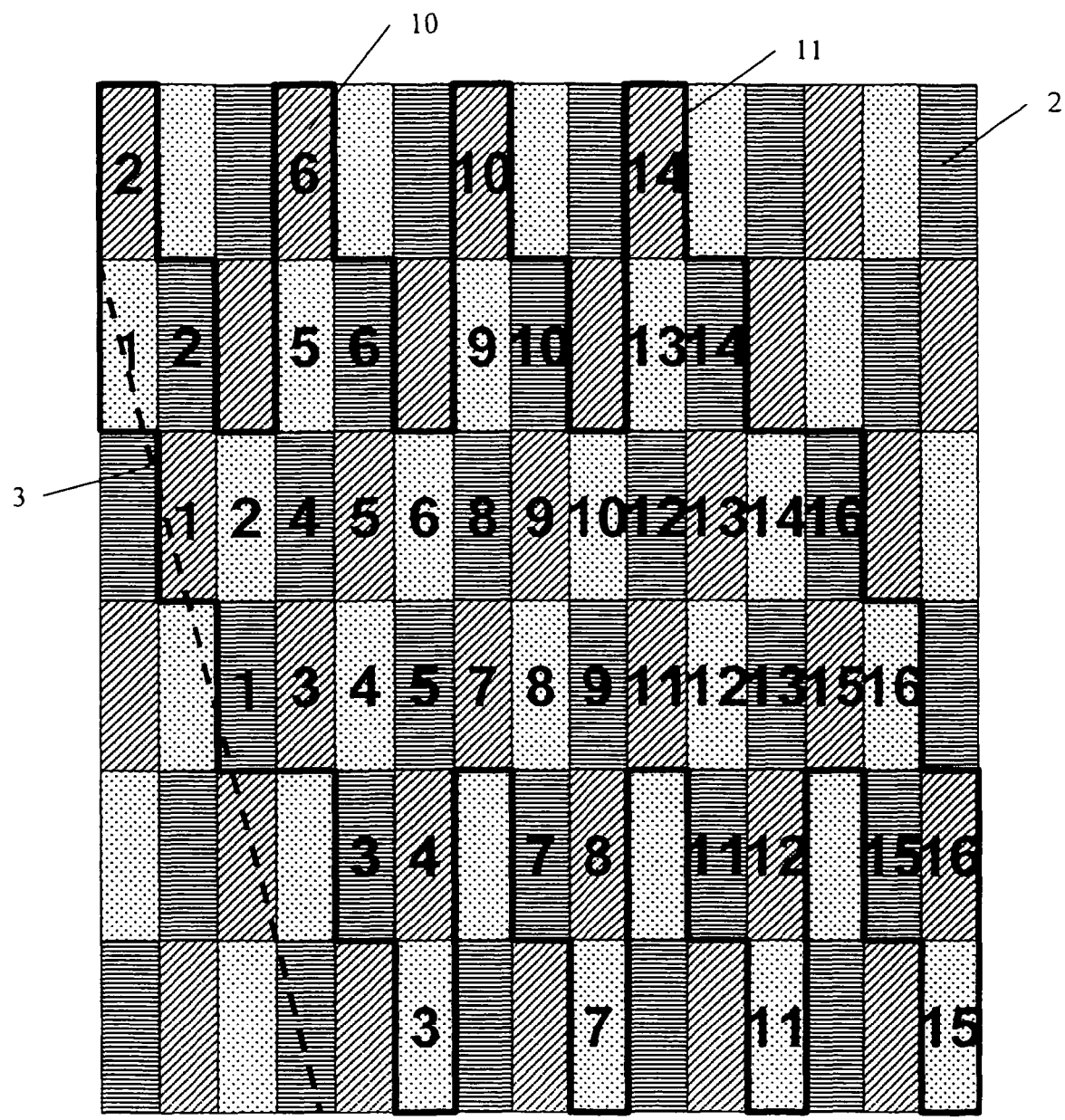
FIG. 9 is a diagram showing arrangement of parallax images on a display element using a color filter with a mosaic arrangement when an inclination of a single exit pupil in an optical plate is set to arc tan (¼) in a three-dimensional image display device according to one embodiment of the invention.
Figure 10:
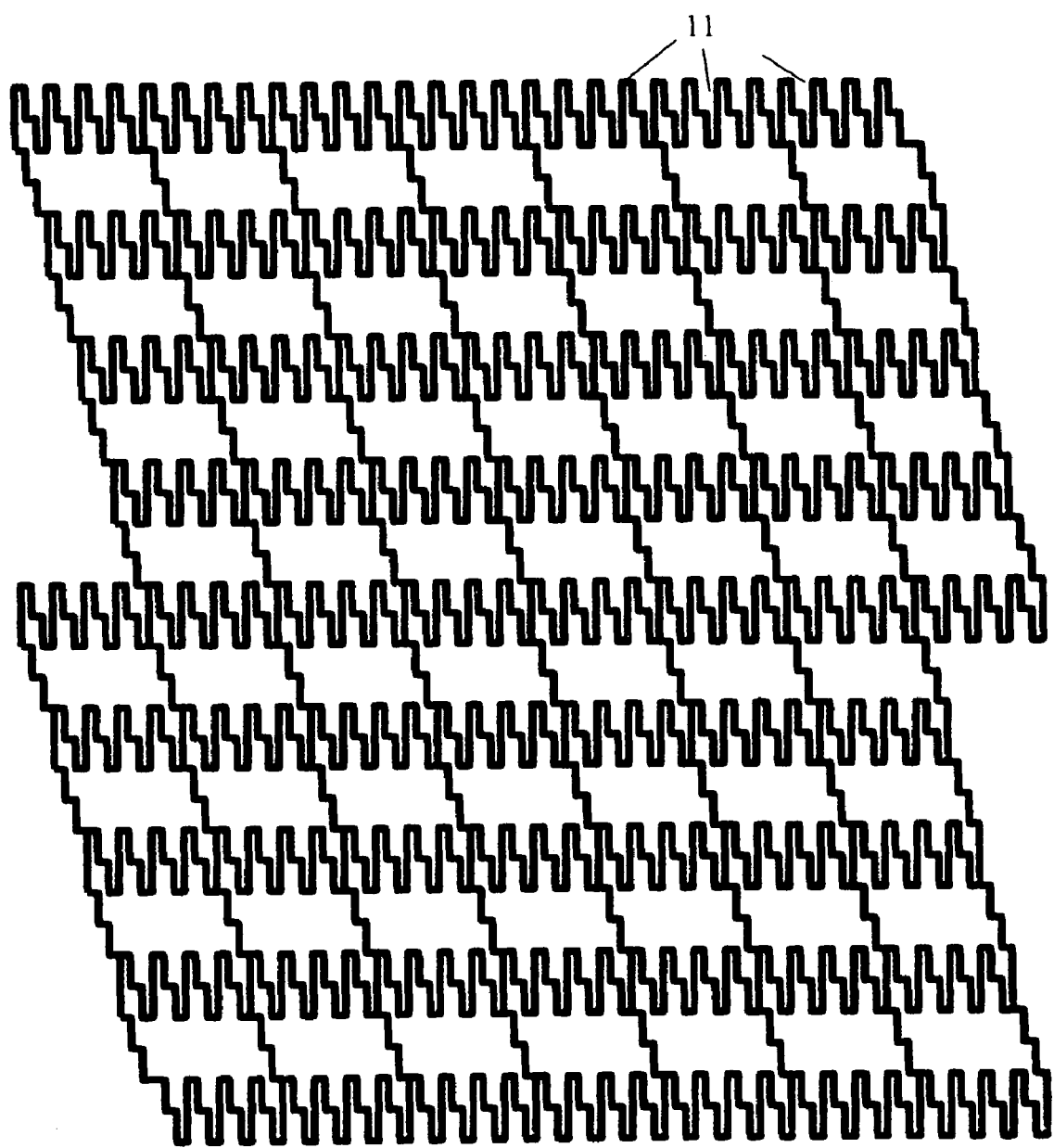
FIG. 10 is a diagram showing arrangement of a plurality of elemental images on a display element using a color filter with a mosaic arrangement when an inclination of a single emit pupil in an optical plate is set to arc tan (¼) in a three-dimensional image display device according to one embodiment of the invention.

FIGS. 6A and 6B show the example where the pixel mapping has been performed on the assumption that a color filter with a stripe arrangement is used, but mapping may be performed regarding another color filter arrangement. Arrangement of parallax images on a two-dimensional image display device where the color filter arrangement is a mosaic arrangement is shown in FIG. 9, and arrangement of a plurality of elemental images are shown in FIG. 10. The color filter arrangement is finally determined to be optimal based upon color moire generated due to correlation between the standard number of parallaxes and the color filter or another displaying performance. For example, in the constitution of the present invention, since a horizontal pitch of exit pupils becomes multiples of 3 to a sub-pixel width, when a device using the color filter with a stripe arrangement is used as the two-dimensional image display device, equal colors are arranged in a horizontal direction (color moire of one kind). Therefore, when the resolution in the three-dimensional image display device is not high sufficiently, such a case that a viewer is nervous about the horizontal RGB stripe may occur. In this case, such a problem can be solved by adopting a mosaic arrangement. Even when a color filter arrangement other than the stripe arrangement or the mosaic arrangement is employed, it is necessary to perform mapping correspondingly. In either case, such a design can be adopted that a triplet of RGB is mapped on different columns and the triplet can be substantially simultaneously viewed through a lens.

Figure 11A:
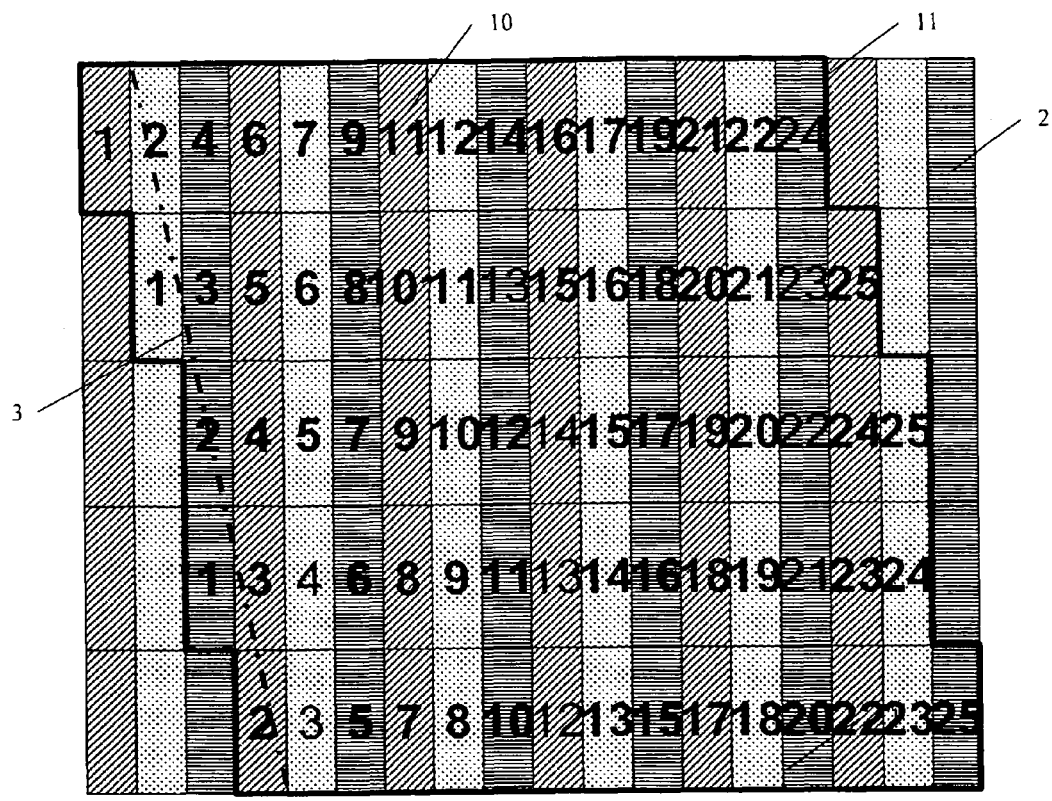
FIGS. 11A and 11B are diagrams showing characteristics according to one embodiment of the invention, FIG. 11A being a diagram showing arrangement of parallax images on a display element using a color filter with a stripe arrangement when an inclination of a single emit pupil in an optical plate is set to arc tan (⅕) and FIG. 11B being a diagram showing relative positions among a plurality of elemental images.
Figure 11B:
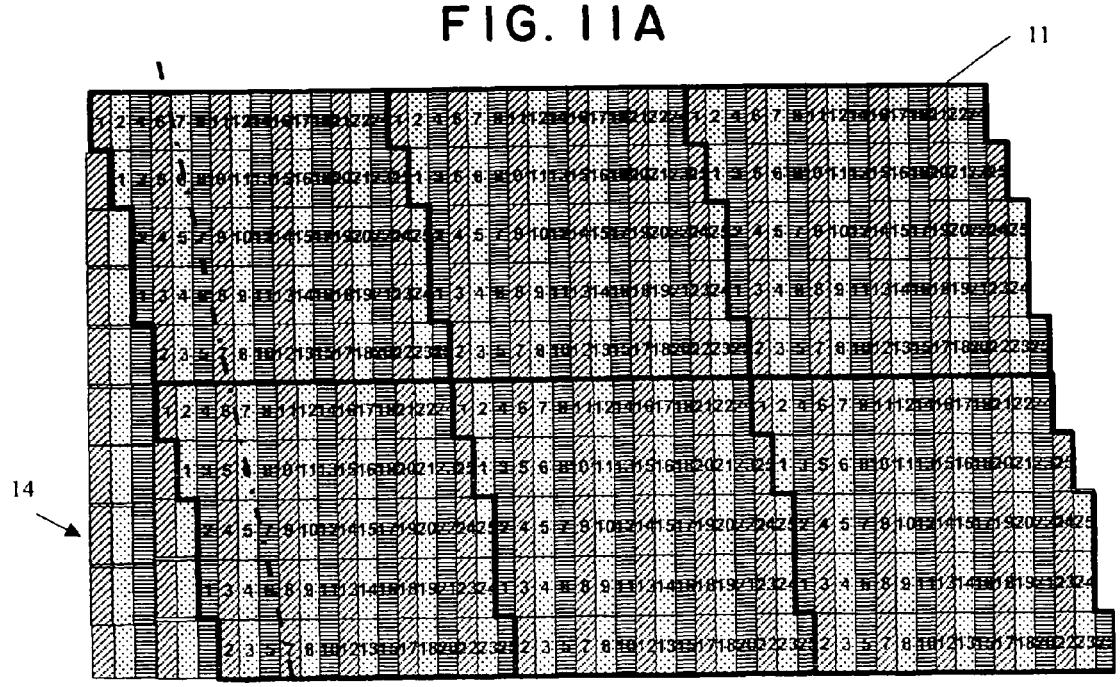
Figure 12:
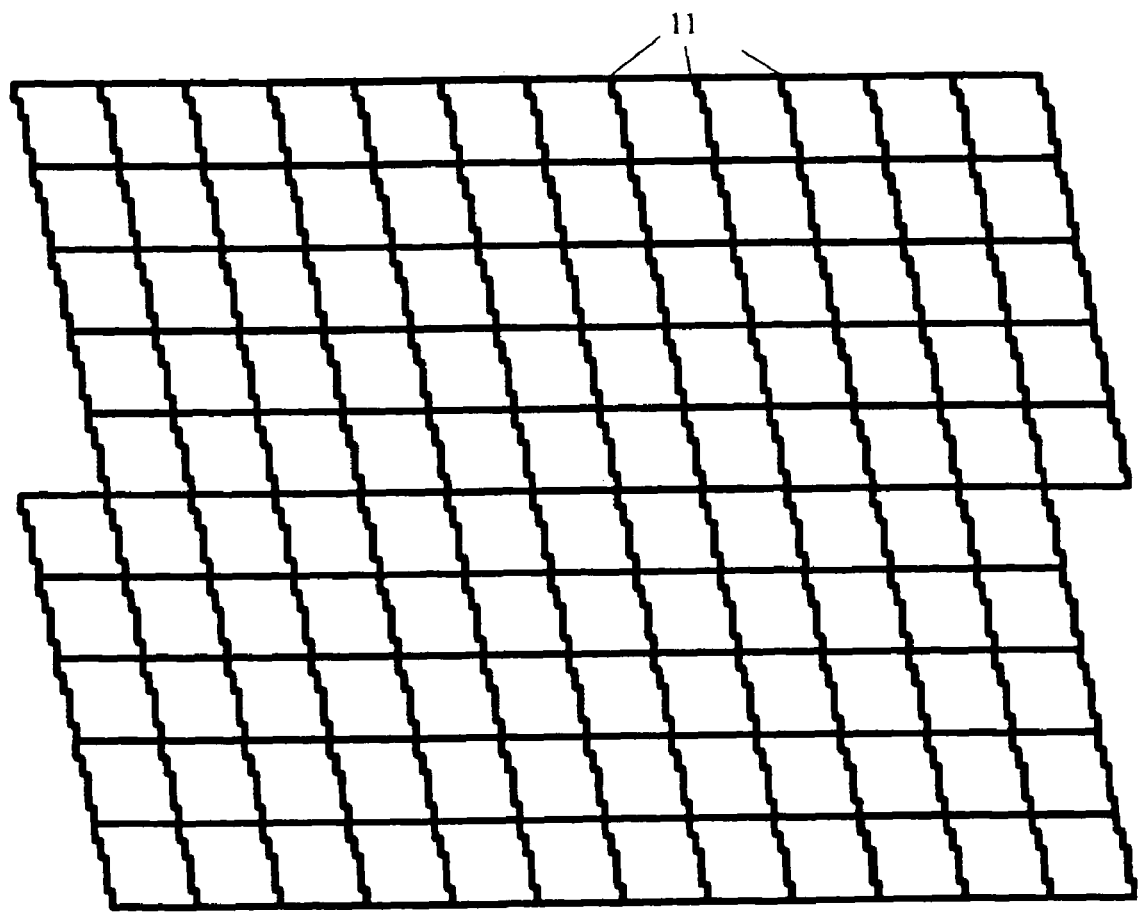
FIG. 12 is a diagram showing arrangement of a plurality of elemental images on a display element using a color filter with a stripe arrangement when an inclination of a single exit pupil in an optical plate is set to arc tan (⅕) in one embodiment of the invention.
Figure 13:
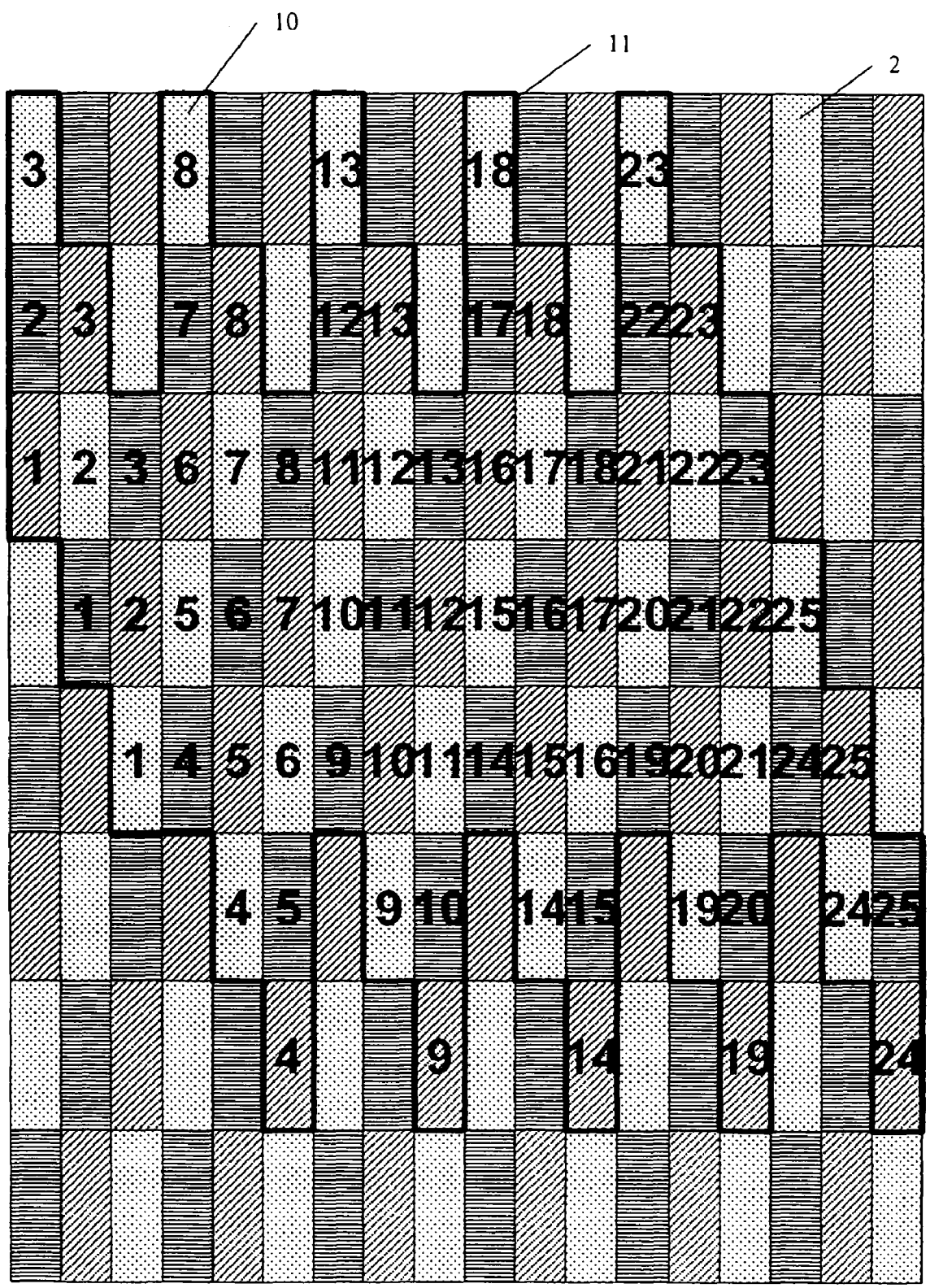
FIG. 13 is a diagram showing arrangement of parallax images on a display element using a color filter with a mosaic arrangement when an inclination of a single exit pupil in an optical plate is set to arc tan (⅕) in one embodiment of the invention.
Figure 14:
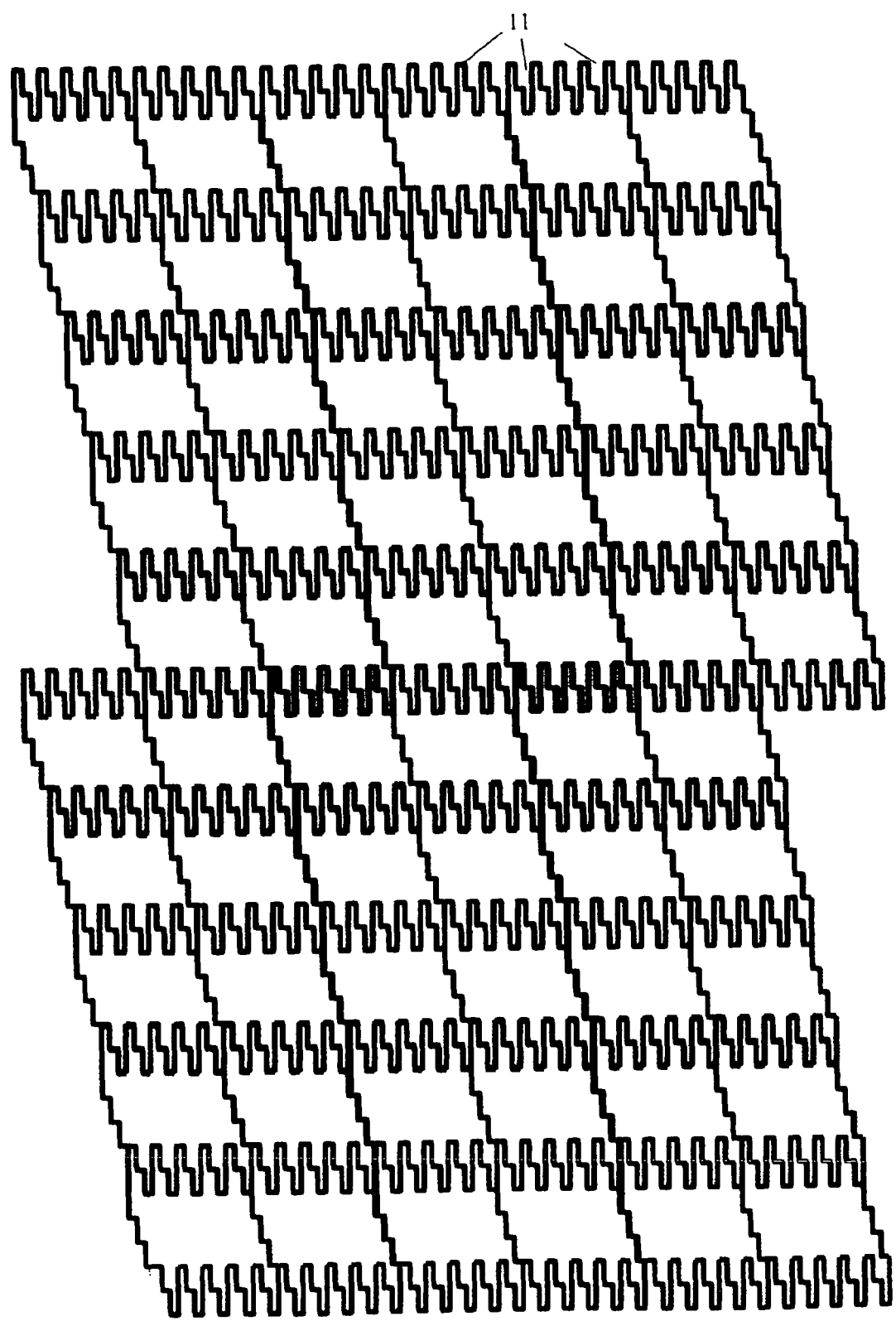
FIG. 14 is a diagram showing arrangement of a plurality of elemental images on a display element using a color filter with a mosaic arrangement when an inclination of a single emit pupil in an optical plate is set to arc tan (⅕) in one embodiment of the invention.

Further, arrangement of parallax images on a two-dimensional image display device using a color filter with a stripe arrangement when the standard number of parallaxes (N) is 25, namely, when the inclination of the optical plate is set to arc tan (⅕) is shown in FIG. 11A, relative positions among a plurality elemental images are shown in FIG. 11B, and arrangement of a plurality of elemental images is shown FIG. 12. Arrangement of parallax images on a two-dimensional image display device using a color filter with a mosaic arrangement when the inclination of the optical plate is set to arc tan (⅕) is shown in FIG. 13, and arrangement of a plurality of elemental images is shown in FIG. 14.

Now, as also described in U.S. Pat. No. 6,064,424, when the inclination of the optical plate becomes small, there is a problem that crosstalk between parallax images increases. This becomes especially significant when such a small angle as shown in U.S. Pat. No. 6,064,424 (θ=arc tan (1/n), n=6, 9, 12; refer to FIG. 3).

Figure 15:
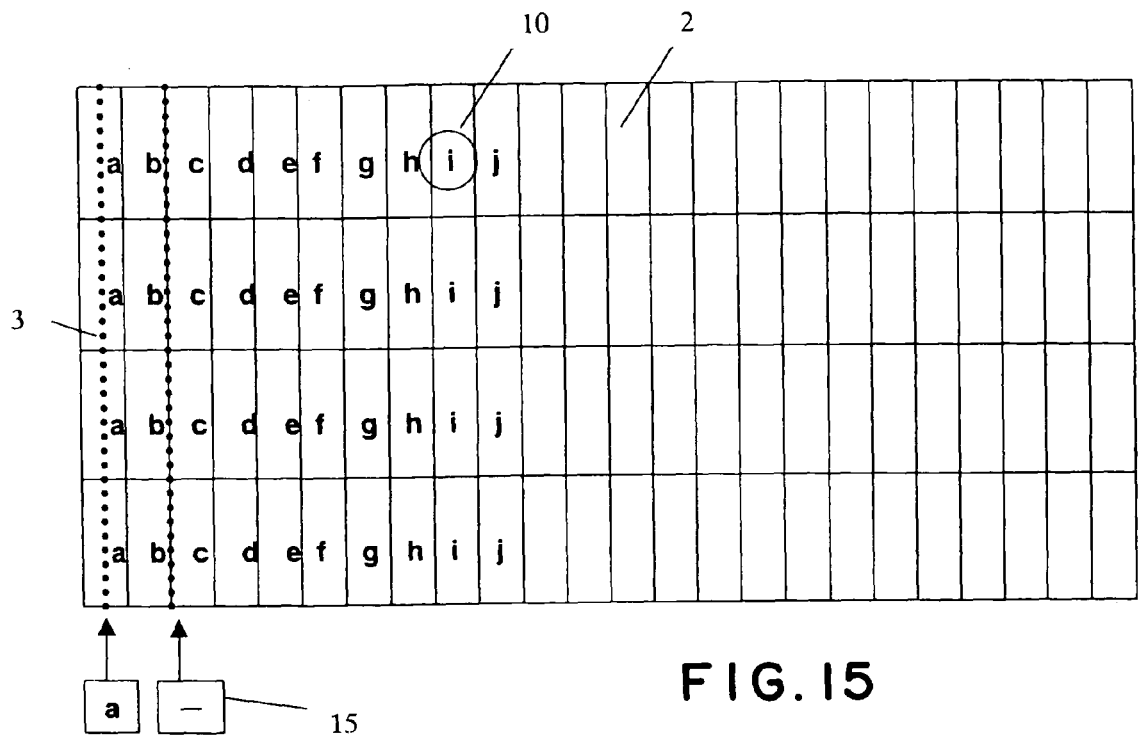
FIG. 15 is a diagram showing parallax image numbers viewed via an optical plate with no inclination.

The amount of crosstalk will be explained with reference to FIG. 15 to FIG. 18. FIG. 15 is a diagram showing parallax numbers viewed through an optical plate which has an inclination of zero, namely, whose exit pupils are vertical. In FIG. 15, reference numeral 15 shows a ratio of the parallax numbers viewed through the exit pupils. For example, a focal position of an exit pupil of a single lens of a plurality of semi-cylindrical (a shape obtained by cutting a cylinder in a longitudinal axis and adhering the cut cylinder and a cube having a side face with the same size as that of the cut face to each other) constituting a lenticular sheet arranged on a front face of an image display device formed in a matrix shape is shown with a dotted line. In this case, a width of a sub-pixel for a two-dimensional image display in an image display device is set to ⅓ of a height of the sub-pixel, so that a square triplet is formed of three sub-pixels. A reference numeral 10 is a parallax image number described in each sub-pixel. The lenticular sheet is designed such that a two-dimensional image display device where pixels are provided in a matrix shape is positioned at a position of a focal length thereof, so that a width of a broken line (a focal position) on the two-dimensional image display device can be assumed to be infinitely small. As shown in FIG. 15, when a lenticular lens is vertical (the inclination is zero), only a parallax image with a single number is viewed from a single exit pupil. Alternatively, when a region indicated by a reference numeral 3 coincident with a vertical pixel boundary between sub-pixels adjacent to each other in a horizontal direction, any parallax image is not viewed at all.

Figure 16:
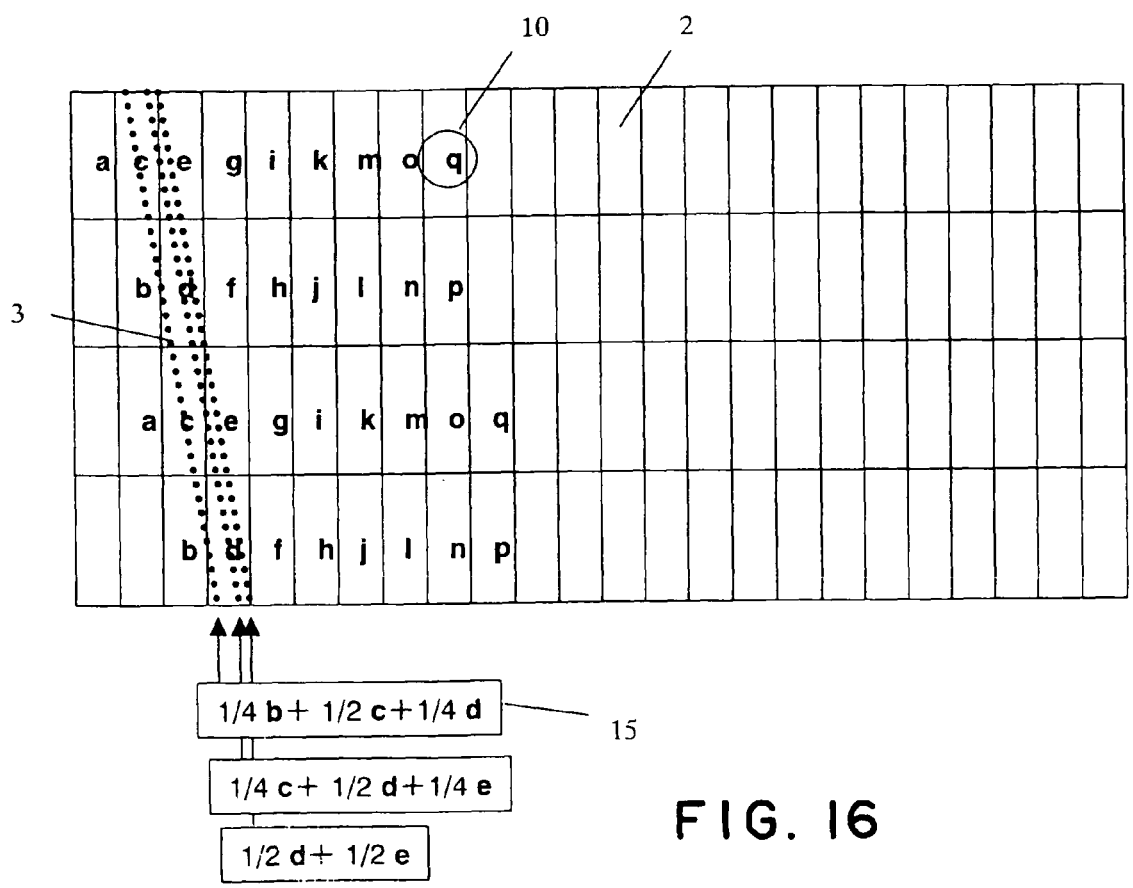
FIG. 16 is a diagram showing parallax image numbers viewed via a single exit pupil in an optical plate whose inclination angle is arc tan (⅙)

On the other hand, FIG. 16 is an explanatory diagram showing parallax numbers viewed through exit pupils in an optical plate when the inclination of the lenticular lens is θ=arc tan (⅙). In this case, parallax images over at least two parallaxes and at most three parallaxes can be viewed via a single exit pupil simultaneously. Hereinafter, a parallax image to be viewed actually is called "a main parallax", and another parallax image which has been viewed simultaneously with the main parallax is called "an adjacent parallax".

As experimental results supporting a difference in vision between parallax images, the followings are shown. In the IP type three-dimensional image display device using the arrangement shown in FIG. 15, contents with an excessive projection amount/an excessive depth amount appears as a double image. On the other hand, in the arrangement shown in FIG. 16, the parallax image is viewed as blur and a width of the blur is larger than a deviating width of the double image in FIG. 15. This phenomenon occurs due to that a difference between parallax images is large in contents with a large projection amount/a large depth amount so that a crosstalk generated by viewing a main parallax and an adjacent parallax simultaneously can be recognized easily. In the constitution shown in FIG. 15, only a single parallax number should be originally viewed. In an actual machine which has been manufactured by the present inventors, however, a lens is slightly defocused, where when a region indicated by reference numeral 3 coincides with a boundary, parallax images on both side of the boundary can be viewed. That is, there is a case that an adjacent parallax image together with a main parallax image is viewed. A double image was viewed due to the adjacent image viewed simultaneously with the main parallax image.

On the other hand, in the constitution shown in FIG. 16, a region indicated by reference numeral 3 crosses pixels obliquely, which means that the main parallax image and the adjacent parallax image can be seen via a single exit pupil while being smoothly switched between them. Simultaneously therewith, the number of adjacent parallax images viewed via a single exit pupil exceeds the number thereof in the constitution shown in FIG. 15. That is, influence due to the adjacent parallax image appears as a blur different from a double image shown in FIG. 15. Further, it can be understood that a range of the blur becomes broader than the case shown in FIG. 15 due to a high number of adjacent parallax images to be viewed.

The lenticular lens is set obliquely in this manner so that the amount of crosstalk is increased and the crosstalk is viewed as a blur. The occurrence of crosstalk eventually restricts a projection display region/a depth display region of contents. Therefore, an example of n=6 meaning a relatively small inclination, namely, an example of a selection ratio of ½ is positively described in U.S. Pat. No. 6,064,424.

Figure 17:
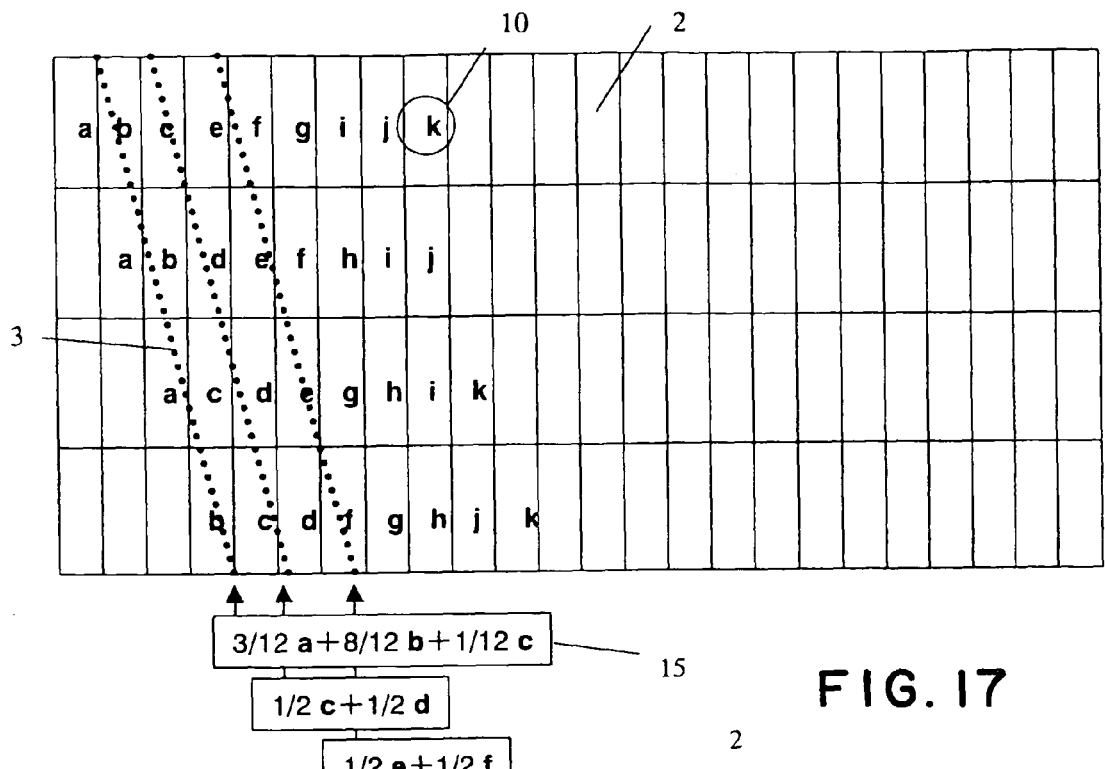
FIG. 17 is a diagram showing parallax image numbers viewed via a single exit pupil in an optical plate whose inclination angle is arc tan (¼)
Figure 18:
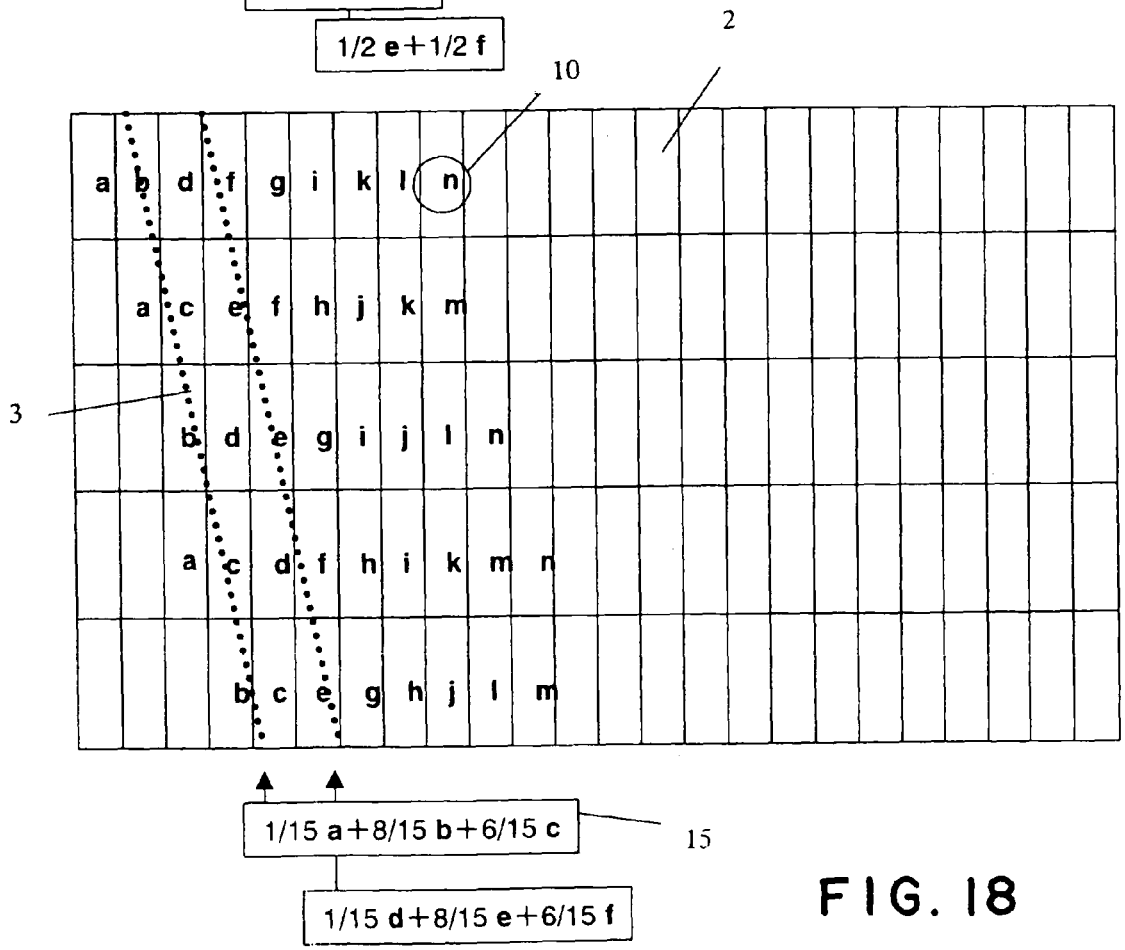
FIG. 18 is a diagram showing parallax image numbers viewed via a single exit pupil in an optical plate whose inclination angle is arc tan (⅕)

FIG. 17 and FIG. 18 are diagrams showing parallax numbers viewed through optical plates set to θ=arc tan (¼) and θ=arc tan (⅕) in this embodiment. As shown in FIG. 17, it is understood that, in the case of θ=arc tan (¼), parallax images appearing as crosstalk correspond to three parallaxes, which is the same as the case of θ=arc tan (⅙), but an occupation ratio of a main parallax image to a plurality of parallax images which can be viewed simultaneously is high. As shown in FIG. 18, it is understood that, in the case of θ=arc tan (⅕), parallax images appearing as crosstalk correspond to three parallaxes, but an occupation ratio of a main parallax image to parallax images is ½ or more. That is, in these inclinations, i.e., in the cases of θ=arc tan (¼) and θ=arc tan (⅕), crosstalk occurs, but a ratio of mixing of adjacent parallax images other than a main parallax image is low so that such an advantage can be obtained that blur is reduced and a projection/depth display region is broadened.

As described above, the present invention includes a novel definition achieving such plural new advantages that 0 # arc tan (⅓ m) including these inclinations (0=arc tan (¼) and θ=arc tan (⅕)) serves not only to prevent display blocking due to the non-display region in the conventional technique but also to maintain a ratio of a horizontal resolution/a vertical resolution and to form a pixel shape at a display time of a three-dimensional image in an almost square, and it serves to facilitate conversion of contents and further expand a display-allowable range in a depth/projection direction by avoiding waste at a time of elemental image preparation and considering an existing resolution in a two-dimensional image display. Further, in the concept disclosed in U.S. Pat. No. 6,064,424, an approach where the horizontal resolution is cut at a pitch of ½ to ¼ time a sub-pixel width (the horizontal resolution is increased to 2 to 4 times and the vertical resolution is decreased to ½ to ¼ time) is employed. On the other hand, in the embodiment, such an approach that the horizontal resolution is cut at a pitch which is not 1/m time such as ¾ time or ⅗ times by selecting three sub-pixels which are positioned in different rows to the same parallax image is employed, which is a novel approach. Moreover, since 2 values of, especially, a=¾ and a=⅗ which are included in a group of a≠⅓ m is a value of ½ or more, a mixing ratio of an adjacent parallax image becomes low and a clear parallax image where crosstalk is further suppressed can be viewed.

Such a fact that it is effective to incline a lens for solving a problem about moire has been already described in detail. In further description, it is effective for suppressing moire that a Cs line (supplemental capacitance) in a LCD (liquid crystal display) panel is set to pass across a center portion of a sub-pixel from side to side. This is because an opening center portion is made double by dividing the sub-pixel into upper and lower halves by the Cs line (the supplemental capacitance line), an occurrence cycle of an opening center viewed through an exit pupil in an optical plate is made short according to application of the above-mentioned content, so that a distribution of luminance reduction generated due to a non-display potion of a pixel can be made even within a screen in the IP system and it can be made even in a space in the multiview system.

In the IP system, it is necessary to distribute elemental images constituting (the standard number of parallaxes+1) columns discretely in order to secure a viewing area fully (for example, refer to Japanese Patent Application No. 2002-282389 which has been assigned to assignee of this application). However, it is possible to combine a lenticular sheet with an inclination according to the embodiment and this approach for application to the IP system.

In the above, mapping of parallax images has been recommended as shown in FIG. 8 in order to achieve high efficiency for acquiring parallax image information at a time of elemental image preparation. However, a two-dimensional image where pixel arrangement at a display time of a three-dimensional image is maintained may be acquired in order to avoid image degradation due to shifting corresponding to one pixel width of a pixel for a three-dimensional image display in a horizontal direction for every four rows in FIG. 8. That is, the above image degradation can be completely prevented by using parallax images which have a resolution of 800 (H)×600 (V) and are arranged in a matrix manner of parallelogram with an inclination of θ=arc tan (¼) equivalent to the case shown in FIG. 8 instead of using parallax images whose pixel centers constitute a square matrix. This can be realized easily by causing pixel arrangement in a camera used for obtaining a shot image or pixel arrangement in a camera assuming image acquirement in a 3D—CG case to correspond to pixel arrangement for a three-dimensional image display at a display time of a three-dimensional image shown in FIG. 8.

A method can be applicable of re-preparing image data for a parallelogram matrix arrangement from two-dimensional image information for a square arrangement. When two-dimensional image information acquired as data on a square grating in a plurality of directions is combined into an image for a three-dimensional image display whose center coordinates are positioned on a parallelogram grating for a three-dimensional image display, as described previously, assuming that a method which selects a nearest neighbor pixel to take a real number value instead of an integer value is a nearest neighbor method called in an image interpolation process, it is considered to apply a bi-linear process which performs a linear density interpolation according to coordinates (a real number value) of a parallelogram grating from two pixels of data on a square grating adjacent to each other horizontally (because of the parallelogram grating). Similarly, a bi-cubic method may be applicable. In this application, however, a technique corresponding to the nearest neighbor method is proposed considering such a merit that it is unnecessary to re-configure image data. A data preparation for a three-dimensional image display like the bi-linear method or the bi-cubic method may be selected according to balance between load for re-configuration of image data and image quality.

EXAMPLES

Examples of the present invention will be explained below.

Example 1

Figure 19:
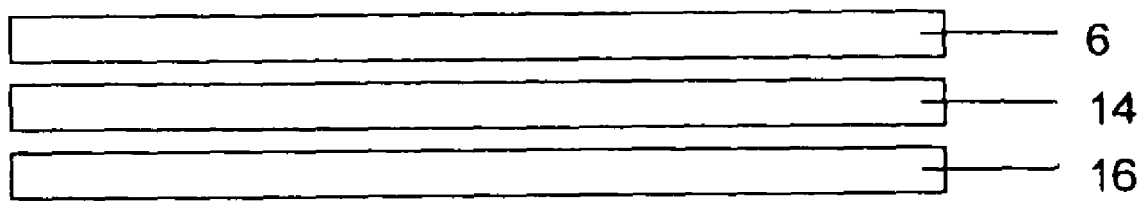
FIG. 19 is a diagram showing a constitution of a three-dimensional image display device according to a first example of the invention.

In Example 1, a multiview type three-dimensional image display device with a structure shown in FIG. 19 was manufactured. The two-dimensional image display device 14 was a liquid crystal display device, which was provided at a front face thereof with an optical plate 6 and at a rear face thereof with a back light 16.

Specifically, in the example 1, a QUXGA—LCD panel (the number of pixels of 3200×2400 and a screen size of 480 mm×360 mm) was used as the liquid crystal display device. In the liquid crystal display device 14, three pixels of red color, green color, and blue color can be driven independently. A length of each of the pixels of red, green, and blue in a horizontal or lateral direction was 50 μm and a length thereof in a vertical direction was 150 μm. The color filter arrangement was a stripe arrangement. Incidentally, in an ordinary two-dimensional image display device, one pixel (one triplet) is constituted of three sub-pixels of red, green, and blue colors arranged laterally or horizontally. In this example, such a constraint was released.

A lenticular sheet including lenticular lenses designed such that a pixel position in a liquid crystal display panel corresponded to almost a focal length was used as the optical plate 6. Such a design was employed that a horizontal lens pitch was made slightly narrower than 600 μm which was two times a sub-pixel width and light rays was converged at 16 portions at a viewing distance of 1.0 m with ½ pitch (=32.5 mm) of an inter-eye distance, where a viewing zone at the viewing distance corresponded to the screen width. The lenticular lenses were arranged at an angle deviated from a vertical direction by about 14.0°.

Figure 20:
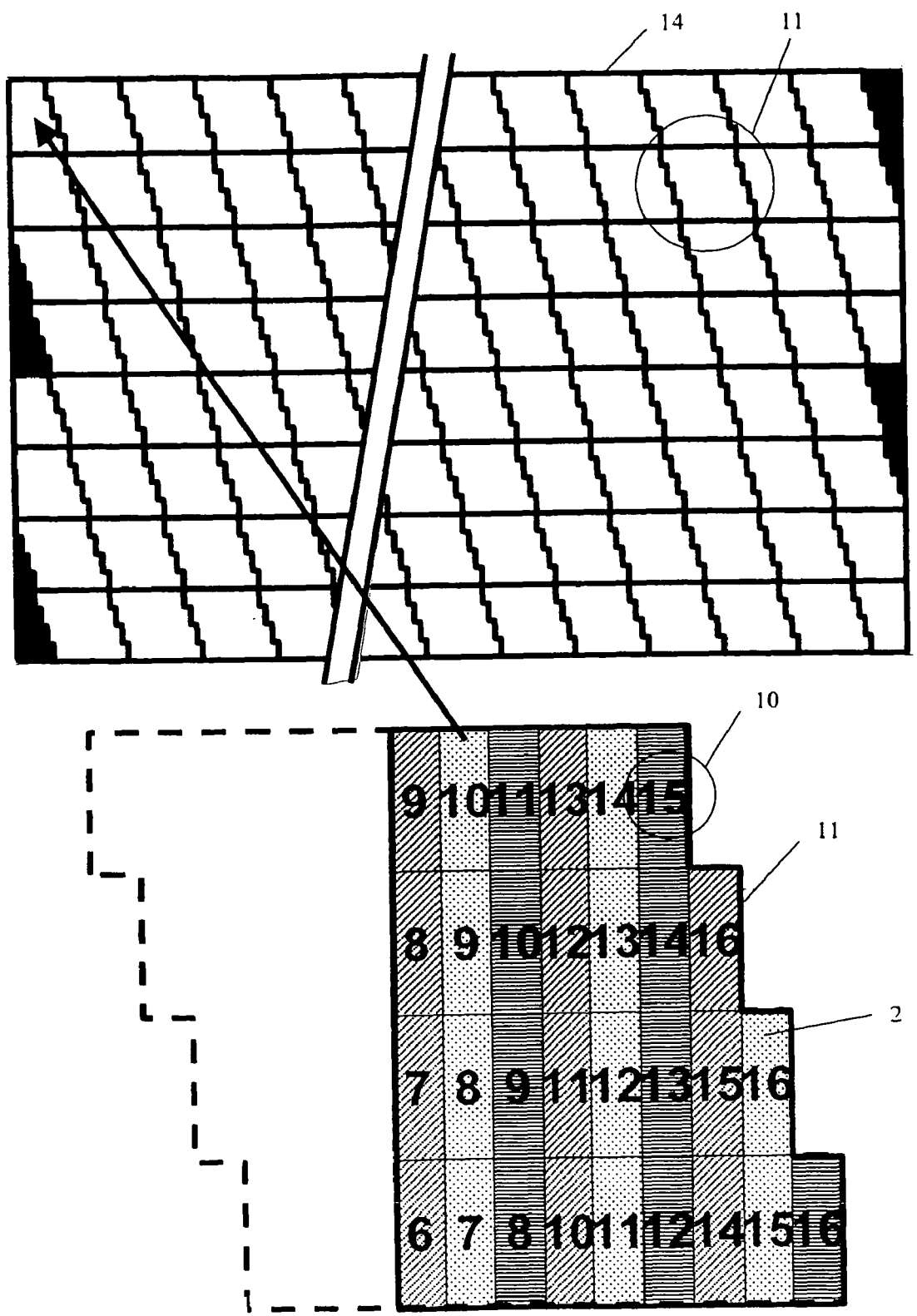
FIG. 20 is a diagram showing one example of a shape of an elemental image positioned at a screen end.

Next, the image producing method will be explained. 16 parallax images (resolution: 800 (×RGB)×600) were acquired by a camera (a virtual camera in CG) from positions of respective converging points of light rays according to a perspective projection. All the image information (800× RGB×600×16 parallax information) acquired was mapped on a QUXGA panel according to mapping shown in FIGS. 6A and 6B. Column information was maintained by performing shifting of one column to the left for every four rows for a pixel for a three-dimensional image display. As shown in FIG. 20, as regards an elemental image on the left end regarding the (4n+1)-th row and the (4n+2)-th row and parallax information about an elemental image on the right end regarding (4n+3)-th row and 4n-th row, portions where their parallax information lacked (mapping could not be performed) occurred. For example, regarding the first to fifth parallax images, data corresponding to one column and one row for constituting an elemental image at the left end on (4n+1)-th row was discarded. Regarding the sixth parallax image information, mapping of only one sub-pixel information corresponding to a color of a sub-pixel distributed with a parallax image number 6 in an elemental image was performed, and similarly mapping of only two sub-pixels information was performed regarding the seventh parallax image. Regarding the eighth parallax image information and parallax images information subsequent thereto, all pixel information was mapped.

When observation was made with the above lens combination after mapping of image information was performed in the above manner, a stereoscopic image of a multiview system could be viewed at a viewing distance of 1.0 m or so (since light rays were converged at ½ of an inter-eye distance, a region where an image was viewed in a stereoscopic manner was also present before and after the viewing distance). In the multiview type three-dimensional image, balance in resolution between a vertical direction and a horizontal direction was improved and contents with a spatial frequency of about 300 cpr could be displayed with a depth of the maximum about ±5 cm before and after the display plane by inclining the lens. Though screen luminance change due to the non-display portion occurred according to movement of a viewing position, occurrence of luminance unevenness within the screen (moire) was suppressed.

Example 2

In Example 2, an IP type three-dimensional image display device with the structure shown in FIG. 19 was manufactured. By designing a pitch of an exit pupil of an optical plate to an integral multiple a sub-pixel pitch in the image display device, such a constitution was achieved that a converging point of light rays did not occur in a viewing distance, which was different from the multiview system. Differences between Example 2 and Example 1 will be explained below.

Figure 21:
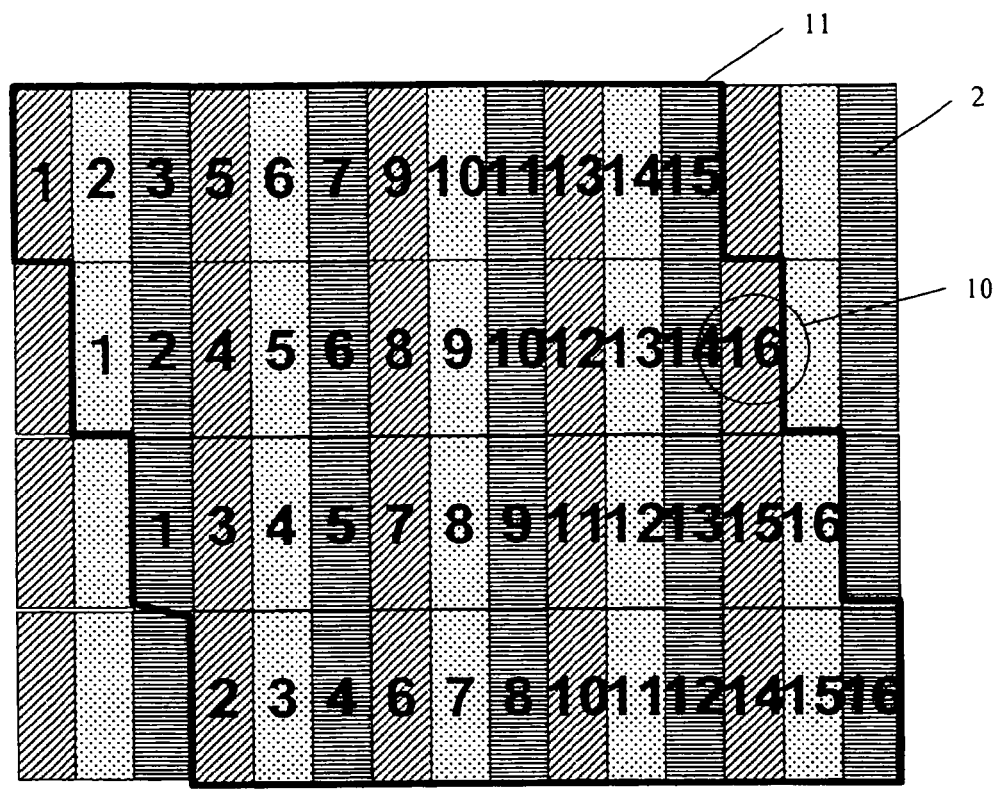
FIG. 21 is a diagram showing occurrence of an elemental image constituted of a standard number of parallaxes.
Figure 22:
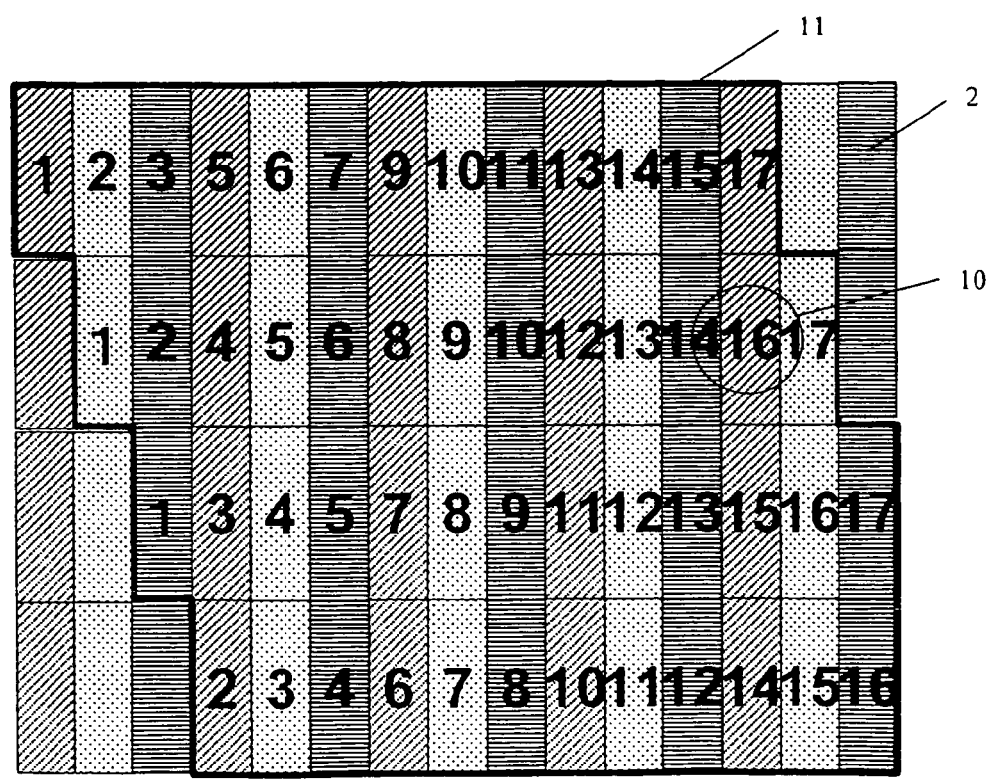
FIG. 22 is a diagram showing occurrence of an elemental image constituted of a standard number of parallax and one parallax generated for maximizing a viewing region in a three-dimensional image display device.
Figure 23:
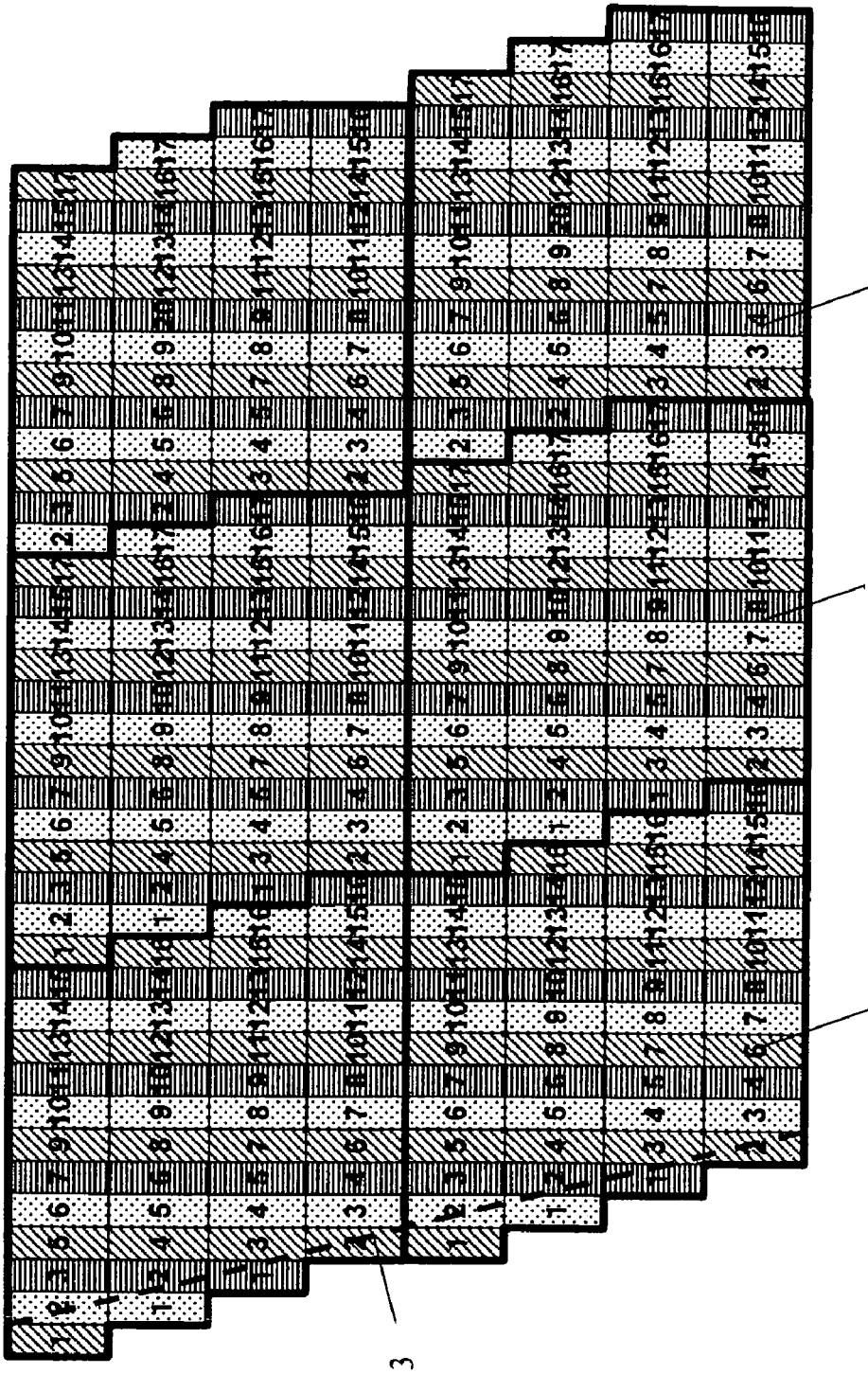
FIG. 23 is a diagram showing an aspect of a distribution of an elemental image constituted of a standard number of parallaxes and an elemental image constituted of a standard number of parallaxes and one parallax.

Design was made that a horizontal pitch of a lens was four times a sub-pixel width, i.e, 600 μm, and a viewing range was ±15°. Thereby, the viewing range (a region could be viewed without mixing a quasi image) corresponding to a screen width at a viewing distance of 1.0 m could be secured. An inclination of a lens was about 14.0°. 28 parallax images whose horizontal directions were applied with parallel projection and whose vertical directions were applied with perspective projection were acquired at the viewing distance by setting a target point on a center of a screen and using a camera (a virtual camera in CG). Because a converging point of light rays were not provided at the viewing distance, in the IP system where perspective projection images obtained at the viewing distance could not be used, when the viewing region was intended to be maximized at the viewing distance, the number of parallax images acquired (the number of positions of a camera acquiring an image) became more than that obtained in the multiview system where a converging point of light rays was provided at the viewing distance. In the embodiment where light rays becomes parallel between adjacent exit pupils, the number of parallel projection parallax images (camera images) obtained increases to the standard number of parallaxes (=16). As to the details thereof, refer to Japanese Patent Application No. 2002-382389 which was assigned to the present assignee. Here, parallax images were acquired with a resolution of 800 (× RGB)×600 from 28 directions. 800×RGB×600×28 parallax information was basically mapped according to the mapping shown in FIG. 6. Incidentally, in the IP system where parallax is taken in consideration, design of elemental image width>exit pupil pitch can be made in a pseudo manner by interposing an elemental image with (the standard number of parallaxes+1) parallaxes discretely such that image information from each elemental image can be viewed within the viewing region. FIG. 21 shows one example of the design. After mapping including parallax image numbers 1 to 16 shown in FIG. 21 is repeated plural times, mapping including parallax image numbers 1 to 17 shown in FIG. 22 occurs. Thereafter, an elemental image which has the same area as that shown in FIG. 21 but includes parallax image numbers 2 to 17 is repeated, but a shape thereof is slightly different from that shown in FIG. 21 (refer to FIG. 23).

When all 28 parallax images are acquired at the same resolution of 800 (H)×600 (V) due to such a fact that this system is an IP system, image information which is not used occurs substantially (As to the details thereof, refer to Japanese Patent Application No. 2002-382389 which was assigned to the present assignee). In addition thereto, there occurs a portion from which parallax information about elemental images at both ends of a screen is discarded like the first example (refer to FIG. 20).

This IP system was slightly complicated as compared with the multiview system, but when observation was made with mapping of image information with a resolution of 800×600 and the combination of lenses described above, a stereoscopic image of an IP system could be viewed in a viewing region based on a viewing distance of 1 m. The IP system three-dimensional image was improved in a vertical/horizontal resolution balance so that image quality was improved and depth display of at most ±5 cm before and after the display plane could be made possible. Any luminance unevenness (moire) within a screen due to a non-display portion was not viewed and luminance change depending on a viewing position could be suppressed completely. A smooth kinematic parallax which was a feature of the IP system where a converging point of light rays was not present at the viewing distance could be realized.

Example 3

Example 3 was approximately similar to the example 2, but it adopted such a design that the standard number of parallaxes was increased to 25. A lenticular lenses designed such that a pixel position on a liquid crystal display panel was a focal length was used as the optical plate. A horizontal pitch of a lens was set to 750 μm which was 15 times a sub-pixel width and an inclination of the lenticular sheet was set to about 11.3°.

At a viewing distance, 44 parallax images whose horizontal directions and vertical directions were applied with parallel projection were acquired at the viewing distance by setting a target point on a center of a screen and using a camera (a virtual camera in CG). A resolution of the parallax image had a resolution of 640 (×RGB)×480. Mapping of 640×RGB×480×25 parallax information was basically performed according to the mapping shown in FIG. 8. As shown in FIG. 12, column information was maintained by shifting three-dimensional image display pixels to the left by a width of the three-dimensional image display pixel for every five rows thereof. Two elemental images at left ends of the (5n+1)-th and the (5n+2)-th rows, an elemental image at both ends of the (5n+3)-th row, and two elemental images at right ends of the (4n+4)-th and the 5n-th rows included portions where parallax information was lacking (mapping could not be performed).

This IP system was slightly complicated as compared with the multiview system, but when observation was made with mapping of image information with a resolution of 640×480 and the above-described combination of lenses, a stereoscopic image of an IP system could be viewed in a viewing region based on a viewing distance of 1.0 m. The IP system three-dimensional image was improved in a vertical/horizontal resolution balance so that image quality was improved and depth display of at most about ±15 cm before and after the display plane could be made possible. Any luminance unevenness (moire) within a screen due to a non-display portion was not viewed and luminance change depending on a viewing position could be suppressed completely. A smooth kinematic parallax which was a feature of the IP system where a converging point of light rays was not present at the viewing distance could be realized.

Example 4

Example 4 was approximately similar to Example 2, but it adopted a display panel having a color filter with a mosaic arrangement. Differences between Example 4 and Example 2 will be explained below.

Regarding 28 parallax images acquired at a resolution of 800 (×RGB)×600, 800 (×RGB)×600×28 parallax image was mapped according to the mapping shown in FIG. 9. In the IP system, elemental images of (the standard number of parallaxes+1) parallaxes were generated discretely such that image information from each elemental image could be viewed within a viewing range. When observation was made with a combination thereof with a lens, a stereoscopic image of an IP system could be viewed within a viewing range based upon a viewing distance of 1 m.

The IP system three-dimensional image was improved in a vertical/horizontal resolution balance so that image quality was improved and depth display of at most about ±5 cm before and after the display plane could be made possible. Any luminance unevenness (moire) within a screen due to a non-display portion was not viewed and luminance change depending on a viewing position could be suppressed completely. A smooth kinematic parallax which was a feature of the IP system where a converging point of light rays was not present at the viewing distance could be realized. Further, since the color filter with the mosaic arrangement was employed, R, B or G viewed through the lenticular sheet were further dispersed, so that there was a tendency that display blocking due to continuation of regions which were viewed as R, B, or G could be suppressed.

Comparative Example 1

In a three-dimensional image display device of a multiview system similar to Example 1, an inclination of a lens was changed to 9.5° which was equivalent to the art disclosed in U.S. Pat. No. 6,064,424, a horizontal width of a lens was correspondingly set to 400 μm equal to 8 sub-pixels width which was ½ a width of 16 sub-pixels, and corresponding mapping was performed like that in the art disclosed in U.S. Pat. No. 6,064,424. In this design, a resolution in the three-dimensional image was follows:

"a"=½, therefore, (3200×3÷16÷a):(2400÷3×a)=1200:400.

That is, the horizontal resolution became higher than the vertical resolution. Accordingly, parallax images with a resolution of H (1200)×V (900) were acquired and horizontal information was acquired at a rate of ⅘ (it was discarded at a rate of ⅗), so that mapping of image information was performed. That is, a time for image production was required excessively corresponding to acquisition of waste parallax image information and a large memory capacity was required for temporarily storing respective parallax image data elements acquired from plural directions. A balance in resolution of an image displayed was bad, which impressed poor vertical information relative to horizontal information. An amount of crosstalk was larger than that in Examples, and a depth display was suppressed to ±3 cm before and after the display plane. When contents with an existing resolution was displayed, it was necessary to modify the existing resolution to a resolution of H (1200)×V (400), which resulted in a device with a poor versatility.

Comparative Example 2

In a three-dimensional image display device of a multiview system similar to Example 2, an inclination of a lens was set to 18.4°. When the inclination was employed, an advantage obtained by distributing a vertical resolution to a horizontal resolution can not be obtained. Therefore, a horizontal width of a lens was set to 800 μm equal to a width of 16 sub-pixels, and corresponding mapping (RGB sub-pixels continuous obliquely were grouped) was performed. In this design, a resolution in the three-dimensional image was as follows:
"a"=1,
therefore, (3200×3÷16÷a):(2400÷3×a)=600:800.

That is, the vertical resolution became higher than the horizontal resolution. Accordingly, parallax images with a resolution of H (1600)×V (1200) were acquired, and only ⅜ of data in a horizontal direction and ⅔ of data in a vertical direction were acquired, while the remaining data was discarded, so that mapping of image information was performed. That is, a time for acquiring parallax image information was excessively required corresponding to data to be discarded. A balance in resolution of an image displayed was bad, which impressed poor horizontal information relative to vertical information. When contents with an existing resolution was displayed, it was necessary to modify the existing resolution to a resolution of H (600)×V (800), which resulted in a device with a poor versatility.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concepts as defined by the appended claims and their equivalents.

What is claimed is:

1. A three-dimensional image display device comprising:
a two-dimensional image display device where pixels constituting a pixel group displaying an elemental image are arranged in a matrix shape; and
an optical plate which has exit pupils corresponding to the pixel group and controls light rays from the pixels of the pixel group, wherein
the exit pupils in the optical plate are constituted so as to be continued in an approximately vertical direction, and an angle formed between a direction in which the exit pupils are continued and a column direction of a pixel arrangement in the two-dimensional image display device is given by arctan (1/n) when n is a natural number which is different from multiples of 3.

2. A three-dimensional image display device according to claim 1, wherein a ratio of a horizontal resolution to a vertical resolution in a three-dimensional image is coincident with a ratio of a horizontal resolution to a vertical resolution in the two-dimensional image display device.

3. A three-dimensional image display device according to claim 1, wherein a pixel region constituting the elemental image is formed in an approximately square shape.

4. A three-dimensional image display device according to claim 3, wherein a formation region of the elemental image is an approximately square region of n rows×n columns, and RGB sub-pixels having the same parallax number are positioned over three rows of the n rows forming the elemental image, which are different from one another.

5. A three-dimensional image display device according to claim 3, wherein a formation region of the elemental image is an approximately square region of n rows×n columns, and RGB sub-pixels having the same parallax number are positioned over three columns of the n columns forming the elemental image, which are different from one another.

6. A three-dimensional image display device according to claim 4, wherein three sub-pixels of R, G, and B whose positions viewed through the exit pupils are close to one another of a plurality of sub-pixels forming a pixel region displaying the elemental image are grouped and attached with the same parallax number.

7. A three-dimensional image display device according to claim 1, wherein, when arrangements of RGB sub-pixels having the same parallax number belong to different elemental image, the arrangements are the same.

8. A three-dimensional image display device according to claim 1, wherein, when m and l are positive integers, arrangement of RGB sub-pixels having parallax number m and arrangement of RGB sub-pixels having parallax number (m+n×1) are the same.

9. A three-dimensional image display device according to claim 1, wherein, when a plurality of elemental images are viewed through a single column extending over the plurality of elemental images, the parallax number continuously increases upwardly from 1 to N and the increase is repeated.

10. A three-dimensional image display device according to claim 1, wherein the standard number of parallaxes N is given by $n^2$.

11. A three-dimensional image display device according to claim 1, wherein the standard number of parallaxes N is any one of 16, 25, 49, and 64.

12. A three-dimensional image display device according to claim 1, wherein n is a natural number of 4 or more.

13. A three-dimensional image display device according to claim 1, wherein n is any one of 4, 5, 7, and 8.

14. A three-dimensional image display device according to claim 10, wherein a ratio of a horizontal resolution to a vertical resolution in a three-dimensional image is coincident with a ratio of a horizontal resolution to a vertical resolution in the two-dimensional image display device.

15. A three-dimensional image display device according to claim 10, wherein a pixel region constituting the elemental image is formed in an approximately square shape.

16. A three-dimensional image display device according to claim 14, wherein a formation region of the elemental image is an approximately square region of n rows×n columns, and RGB sub-pixels having the same parallax number are positioned over three rows of the n rows forming the elemental image, which are different from one another.

17. A three-dimensional image display device according to claim 14, wherein a formation region of the elemental image is an approximately square region of n rows×n columns, and RGB sub-pixels having the same parallax number are positioned over three columns of the n columns forming the elemental image, which are different from one another.

18. A three-dimensional image display device according to claim 15, wherein three sub-pixels of R, G, and B whose positions viewed through the exit pupils are close to one another of a plurality of sub-pixels forming a pixel region displaying the elemental image are grouped and attached with the same parallax number.

19. A three-dimensional image display device according to claim 10, wherein, when arrangements of RGB sub-pixels having the same parallax number belong to different elemental image, the arrangements are the same.

20. A three-dimensional image display device according to claim 10, wherein, when m and l are positive integers, arrangement of RGB sub-pixels having parallax number m and arrangement of RGB sub-pixels having parallax number (m+n×l) are the same.

21. A three-dimensional image display device according to claim 10, wherein, when a plurality of elemental images are viewed through a single column extending over the plurality of elemental images, the parallax number continuously increases upwardly from 1 to N and the increase is repeated.

* * * * *